US011409550B2

(12) United States Patent
Suryanarayanan et al.

(10) Patent No.: US 11,409,550 B2
(45) Date of Patent: Aug. 9, 2022

(54) LOW LATENCY CONNECTIONS TO WORKSPACES IN A CLOUD COMPUTING ENVIRONMENT

(71) Applicant: Amazon Technologies, Inc., Seattle, WA (US)

(72) Inventors: Deepak Suryanarayanan, Bellevue, WA (US); Sheshadri Supreeth Koushik, Redmond, WA (US); Nicholas Patrick Wilt, Mercer Island, WA (US); Kalyanaraman Prasad, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 16/389,799

(22) Filed: Apr. 19, 2019

(65) Prior Publication Data
US 2019/0317781 A1 Oct. 17, 2019

Related U.S. Application Data

(63) Continuation of application No. 14/283,179, filed on May 20, 2014, now Pat. No. 10,268,492.

(51) Int. Cl.
*G06F 9/455* (2018.01)
*G06F 9/451* (2018.01)
*H04L 67/1097* (2022.01)

(52) U.S. Cl.
CPC .............. *G06F 9/455* (2013.01); *G06F 9/452* (2018.02); *H04L 67/1097* (2013.01)

(58) Field of Classification Search
CPC ....... G06F 9/455; G06F 9/452; H04L 67/1097
(Continued)

(56) References Cited

U.S. PATENT DOCUMENTS 8,612,641 B1 12/2013 Bozarth et al.
8,706,860 B2 4/2014 Trahan et al.
(Continued)

FOREIGN PATENT DOCUMENTS

CN 102215265 10/2011
CN 102413150 4/2012
(Continued)

OTHER PUBLICATIONS

Office Action from Chinese Application No. 201580026302.9, (English translation and Chinese version), Amazon Technologies, Inc., dated Mar. 19, 2019, pp. 1-10.
(Continued)

*Primary Examiner* — Philip J Chea
*Assistant Examiner* — Hassan A Khan
(74) *Attorney, Agent, or Firm* — Robert C. Kowert; Kowert, Hood, Munyon, Rankin & Goetzel, P.C.

(57) ABSTRACT

A computing system providing virtual computing services may generate and manage remote computing sessions between client devices and virtual desktop instances (workspaces) hosted on the service provider's network. The system may implement a virtual private cloud for a workspaces service that extends out to gateway components in multiple, geographically distributed point of presence (POP) locations. In response to a client request for a virtual desktop session, the service may configure a virtual computing resource instance for the session and establish a secure, reliable, low latency communication channel (over a virtual private network) between the resource instance and a gateway component at a POP location near the client for communication of a two-way interactive video stream for the session. The availability zone containing the POP location may be different than one hosting the resource instance
(Continued)

for the session. Client devices may connect to the gateway component over a public network.

20 Claims, 12 Drawing Sheets

(58) Field of Classification Search
USPC .......................................................... 718/1
See application file for complete search history.

(56) References Cited

U.S. PATENT DOCUMENTS

| | | | |
|---|---|---|---|
| 8,972,485 B1* | 3/2015 | French | G06F 9/5044 709/203 |
| 10,122,828 B1* | 11/2018 | Verma | H04L 67/42 |
| 10,268,492 B2 | 4/2019 | Suryanarayanan et al. | |
| 2008/0270612 A1 | 10/2008 | Malakapalli et al. | |
| 2009/0204964 A1* | 8/2009 | Foley | G06F 21/53 718/1 |
| 2009/0235342 A1 | 9/2009 | Manion et al. | |
| 2009/0276771 A1* | 11/2009 | Nickolov | H04L 67/1029 718/1 |
| 2012/0254439 A1 | 10/2012 | Yamasaki et al. | |
| 2013/0007737 A1* | 1/2013 | Oh | G06F 9/452 718/1 |
| 2013/0212576 A1 | 8/2013 | Huang et al. | |
| 2013/0219468 A1 | 8/2013 | Bell | |
| 2013/0268357 A1 | 10/2013 | Heath | |
| 2013/0290548 A1 | 10/2013 | He | |
| 2013/0332982 A1 | 12/2013 | Rao et al. | |
| 2014/0067917 A1 | 3/2014 | Kim et al. | |
| 2014/0073370 A1 | 3/2014 | Lee et al. | |
| 2015/0081796 A1 | 3/2015 | Xu et al. | |
| 2015/0237097 A1* | 8/2015 | Devireddy | H04L 67/141 709/203 |
| 2015/0281322 A1 | 10/2015 | Dingwell et al. | |
| 2016/0098301 A1* | 4/2016 | Beaty | G06F 11/3495 718/1 |

FOREIGN PATENT DOCUMENTS

| | | |
|---|---|---|
| CN | 103001992 | 3/2013 |
| CN | 103650458 | 3/2014 |
| CN | 103858102 | 6/2014 |
| CN | 103905927 | 7/2014 |
| EP | 2854376 | 4/2015 |
| KR | 20100069237 | 6/2010 |

OTHER PUBLICATIONS

Amazon CloudFront Developer Guide for API Version Nov. 11, 2013. Document updated Dec. 18, 2013, pp. 1-280.
International Search Report and Written Opinion in PCT/US2015/031761, dated Jul. 24, 2015, Amazon Technologies, Inc., pp. 1-13.
Prasad Calyam, et al., "Leveraging OpenFlow for Resource Placement of Virtual Desktop Cloud Applications", Intergrated Network Management, 2013 IFIP/IEEE International Symposium on, IEEE, May 27, 2013, pp. 311-319.
S.Ma, et al., "Survey of Virtual Desktop Infrastructure System draft-ma-clouds-vdi-survey-00", Internet Engineering Task Force, IETF; Standardworkingdraft, Internet Society (ISOC), Jan. 28, 2011, pp. 1-27.
Search Report and Written Opinion from Singapore Application No. 11201609655T, dated Nov. 5, 2018, pp. 1-10.
Office Action from Canadian Application No. V810925CA, dated Jul. 9, 2018, Amazon Technologies, Inc., pp. 1-5.
U.S. Appl. No. 14/523,654, filed Oct. 24, 2014, Eugene Michael Farrell.
Office Action from Korean Application No. 10-2016-7035651, dated Sep. 11, 2017 (English translation and Korean version), Amazon Technologies, Inc., pp. 1-20.

* cited by examiner

LOW LATENCY CONNECTIONS TO WORKSPACES IN A CLOUD COMPUTING ENVIRONMENT This application is a continuation of U.S. patent application Ser. No. 14/283,179, filed May 20, 2014, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. In some systems, virtualized computing resources can be used to implement virtual desktops.

Figure 1:
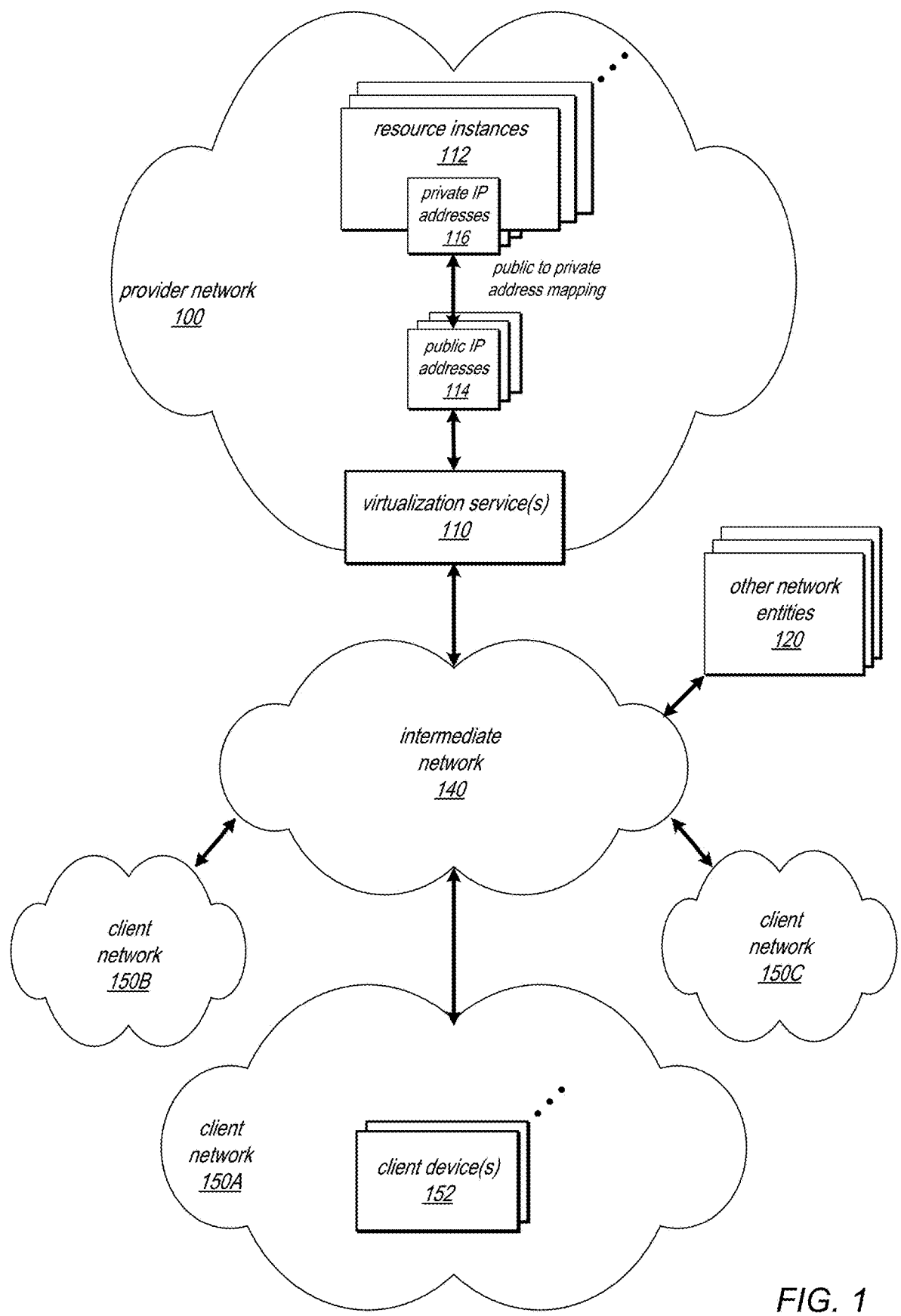
FIG. 1 is a block diagram illustrating an example provider network environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for providing low latency connections (or communication channels) to workspaces (e.g., virtual desktop instances) in a system that provides virtualized computing resources to clients are described herein. A computing system providing virtual computing services may generate and manage remote computing sessions between client computing devices and virtual desktop instances (workspaces) hosted on the service provider's network. For example, the system may implement a workspaces service through which an interactive video stream is delivered to end users on their own computing devices. A large component of the performance of the workspaces service (e.g., the latency in delivering the interactive video stream and/or the quality of the delivered video stream) may be dependent on the network (or series of networks) that provide the connection over which the interactive video stream is delivered to the end users (e.g., a communication channel from a virtual computing resource instance hosted on the service provider's network all the way to a client device that is sitting in an end user's office). In general, the delivery of the interactive video stream may be very time-sensitive, in that any kind of adverse network effects can affect the quality of the connection for the end user. In some embodiments, the systems and methods described herein may minimize the portion of that path that traverses a public network (e.g., the public Internet) and thus exposes the interactive video stream to a relatively low-quality network over which the workspaces service has little control.

In some embodiments, the systems described herein may implement a virtual private cloud (VPC) for the workspaces service that extends out to security gateway or access gateway components (sometimes referred to herein as "gateway components" or simply "gateways") in multiple, geographically distributed point of presence (POP) locations. In other words, these systems may include gateway components that are executing on computing nodes that are physically located close to the client devices of the end users while operating within the VPC of the workspaces service (and remaining under the control of the workspaces service). In some embodiments, this approach may provide a high quality connection and end-user experience through the use of a secure, reliable, low latency, high bandwidth, low loss, and low jitter communication channel for communicating the interactive video stream for a virtual desktop session up to a point as close to a client device as possible before switching to a potentially less-reliable, higher latency public network connection between the gateway component and the client device. Note that the terms "connection" and "communication channel" may be used somewhat interchangeably in the descriptions that follow. However, in various embodiments, the connection or communication channel between a virtual desktop instance and a client device through a gateway component may or may not implement (or rely on) a high-level handshaking protocol and is not limited to a specific type of networking components or to a specific type of virtual or physical connection between networking components.

In some embodiments, a service provider's networked environment may include multiple virtual desktop instances, each of which is hosted on a respective one of multiple computing nodes that collectively implement a virtual desktop (workspaces) service. These computing nodes may be located within data centers in multiple availability zones (e.g., in different buildings, cities, countries, or regions). In some embodiments, this networked environment may include multiple gateway components, each of which is hosted on a respective computing node at a POP location in a one of the availability zones. As described in more detail herein, these gateway components and a management component of the virtual desktop service may interoperate with each other within a virtual private cloud of the virtual desktop service, and may communicate with each other over a virtual private network. In some embodiments, the gateway components may be implemented using virtualized resource instances that are hosted on the computing nodes at the POP locations.

In some embodiments, in response to a client request for a virtual desktop session, the service may configure a virtual computing resource instance as a virtual desktop instance on which to implement the virtual desktop session. This virtual computing resource instance may be one of multiple virtual resource instances that operate (or participate) within a virtual private cloud of the client on whose behalf they were instantiated and/or configured (e.g., a client on whose behalf the request was received from a client device). One or more other virtual computing resource instances may be configured to implement a management component of the service.

In response to the client request for a virtual desktop session, the service may also establish a secure, reliable, low latency connection (e.g., over a virtual private network) between the virtual computing resource instance and a gateway component at a POP location near the client device for communication of a two-way interactive video stream for the session. For example, the interactive video stream may include a stream of pixels that is communicated to the client device from the virtual desktop instance and inputs that are communicated from the client device to the virtual desktop instance that represent user interactions with the virtual desktop instance. In some embodiments, the interactive video stream may include commands that are communicated to the client device from the virtual desktop instance and that represent instructions directing the client device to generate and/or render pixels for display by the client device (e.g., instead of, or in addition to, a stream of pixels). As described in more detail herein, the gateway component may be one of multiple such gateway components hosted at various POP locations, and may be selected for use in providing the session due, at least in part, to its proximity to the client. For example, the gateway component may be one of multiple gateway components hosted at a POP location in the same city, country or region as the client device from which the request was received. Note also that the availability zone in which the gateway component is hosted may be different than the availability zone in which the resource instance for the session. In some embodiments, the gateway component may be selected automatically by a management component of the service (e.g., one operating within the VPC of the service), while in other embodiments a client portion of the service may select the gateway component. Once the connection between the virtual computing resource instance and the gateway component has been established by the service (and a connection is established between the client device and the gateway component), the service may begin a virtual desktop session on the virtual desktop session and initiate the communication of the interactive video stream for the session.

Figure 11:
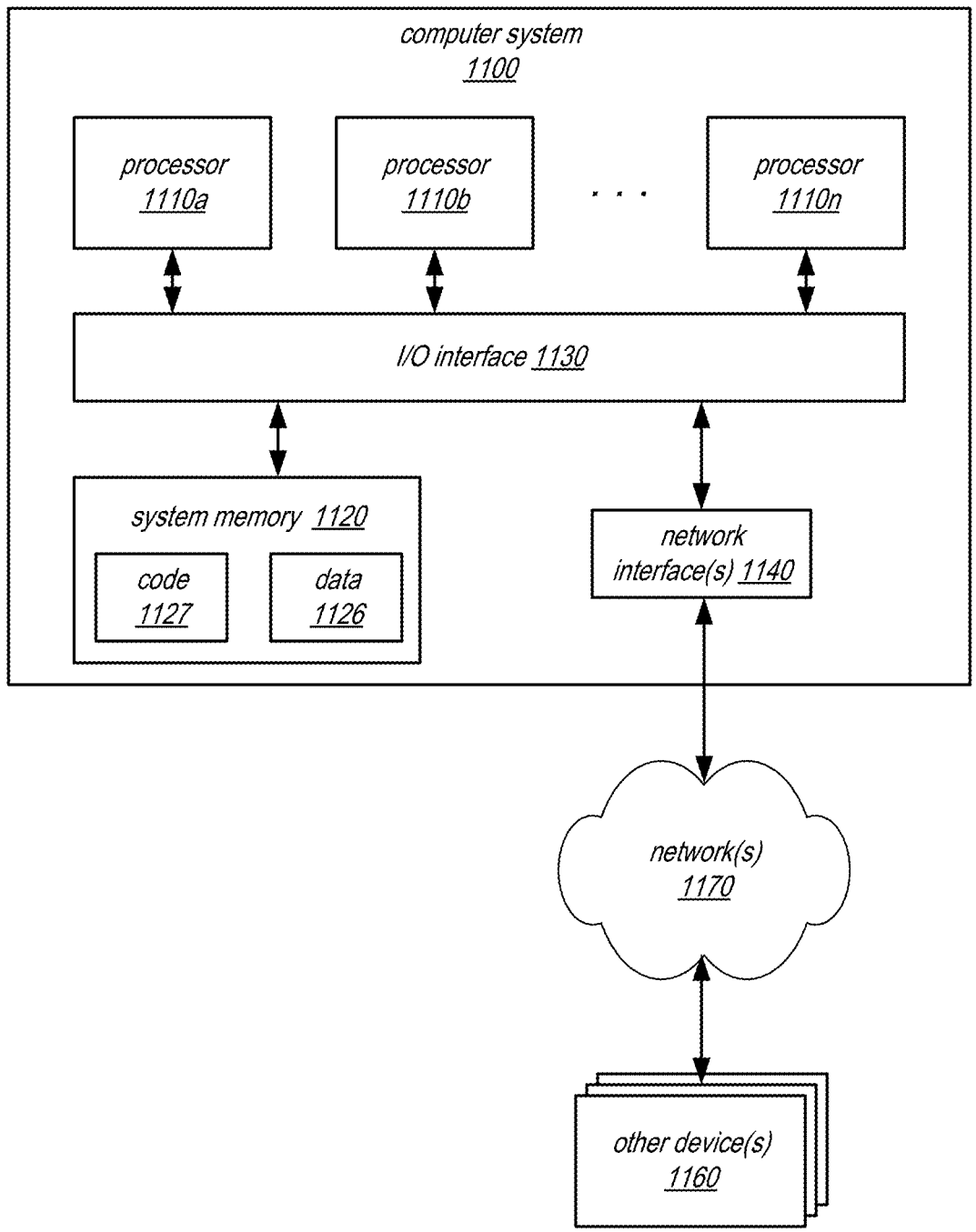
FIG. 11 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for securing workspaces in a cloud computing environment described herein may be implemented is illustrated in FIG. 11. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIGS. 1-7 and 11 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

Figure 4:
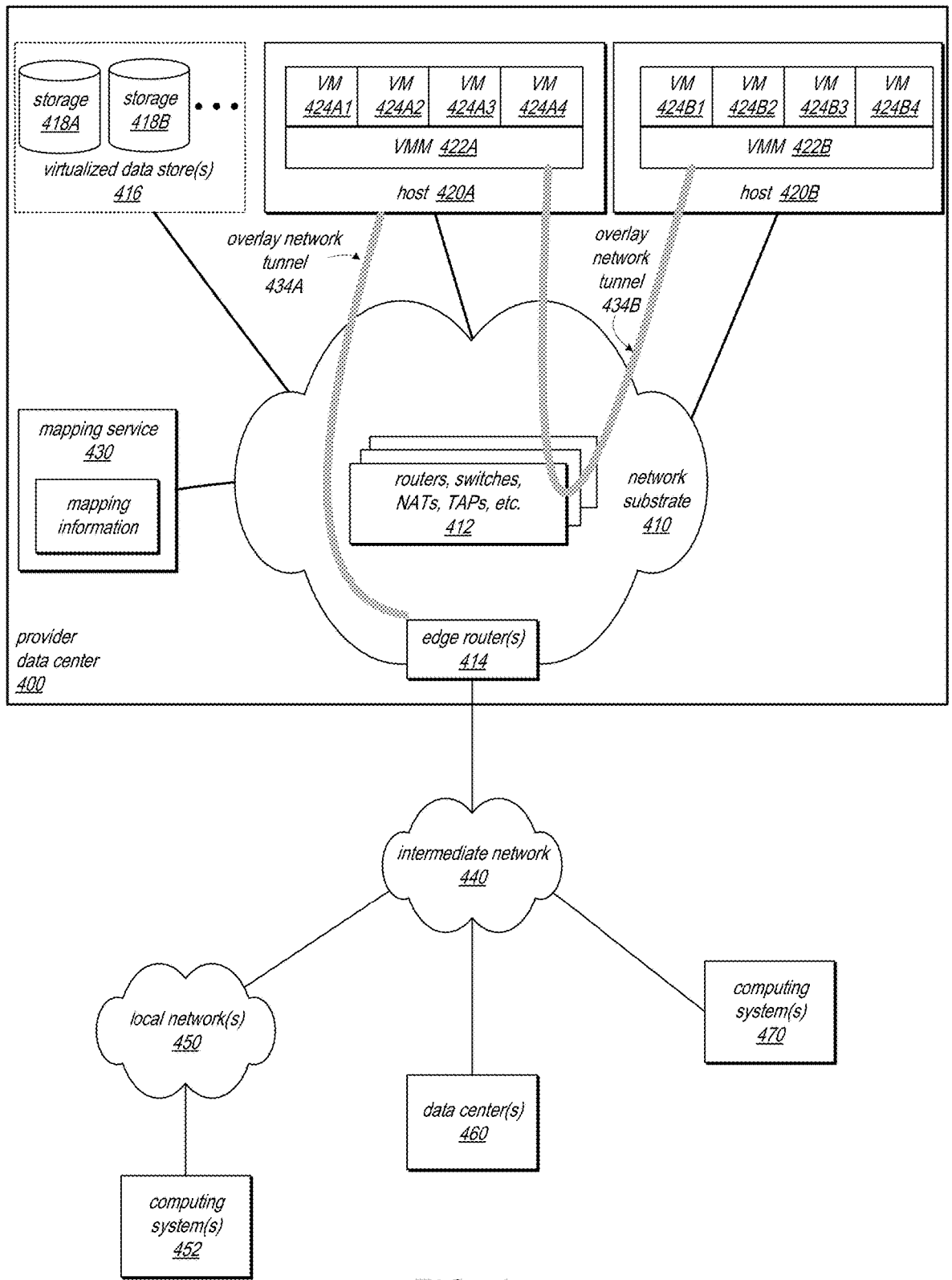
FIG. 4 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 4 and described in detail below.

Note that, in various embodiments, the systems described herein for providing virtual computing services may be deployed across multiple "availability zones", each of which may include its own physically distinct, independent infrastructure on which a collection of computing nodes are implemented. In some embodiments, each availability zone may reside in a different geographic location or region, while in other embodiments multiple availability zones may reside in the same geographic location or region.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be access by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

FIG. 1 illustrates an example provider network environment, according to at least some embodiments. A provider network 100 may provide resource virtualization to clients via one or more virtualization services 110 that allow clients to purchase, rent, or otherwise obtain instances 112 of virtualized resources, including but not limited to computation and storage resources, implemented on devices within the provider network or networks in one or more data centers. Private IP addresses 116 may be associated with the resource instances 112; the private IP addresses are the internal network addresses of the resource instances 112 on the provider network 100. In some embodiments, the provider network 100 may also provide public IP addresses 114 and/or public IP address ranges (e.g., Internet Protocol version 4 (IPv4) or Internet Protocol version 6 (IPv6) addresses) that clients may obtain from the provider 100.

Conventionally, the provider network 100, via the virtualization services 110, may allow a client of the service provider (e.g., a client that operates client network 150A, 150B, or 150C, each of which may include one or more client devices 152) to dynamically associate at least some public IP addresses 114 assigned or allocated to the client with particular resource instances 112 assigned to the client. The provider network 100 may also allow the client to remap a public IP address 114, previously mapped to one virtualized computing resource instance 112 allocated to the client, to another virtualized computing resource instance 112 that is also allocated to the client. For example, using the virtualized computing resource instances 112 and public IP addresses 114 provided by the service provider, a client of the service provider such as the operator of client network 150A may implement client-specific applications and present the client's applications on an intermediate network 140, such as the Internet. Other network entities 120 on the intermediate network 140 may then generate traffic to a destination public IP address 114 published by the client network 150A; the traffic is routed to the service provider data center, and at the data center is routed, via a network substrate, to the private IP address 116 of the virtualized computing resource instance 112 currently mapped to the destination public IP address 114. Similarly, response traffic from the virtualized computing resource instance 112 may be routed via the network substrate back onto the intermediate network 140 to the source entity 120.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 100; a client may then assign their allocated public IP addresses to particular resource instances allocated to the client. These public IP addresses may be referred to as client public IP addresses, or simply client IP addresses. Instead of being assigned by the provider network 100 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 112 that are made available to clients (e.g., client devices 152) via virtualization service(s) 110 may include multiple network interfaces. For example, at least some of them virtualized computing resource instances (including some that are configured to implement virtual desktop instances) may include one network interface for communicating with various components of a client network 150 and another network interface for communicating with resources or other network entities on another network that is external to provider network 100 (not shown).

Figure 2:
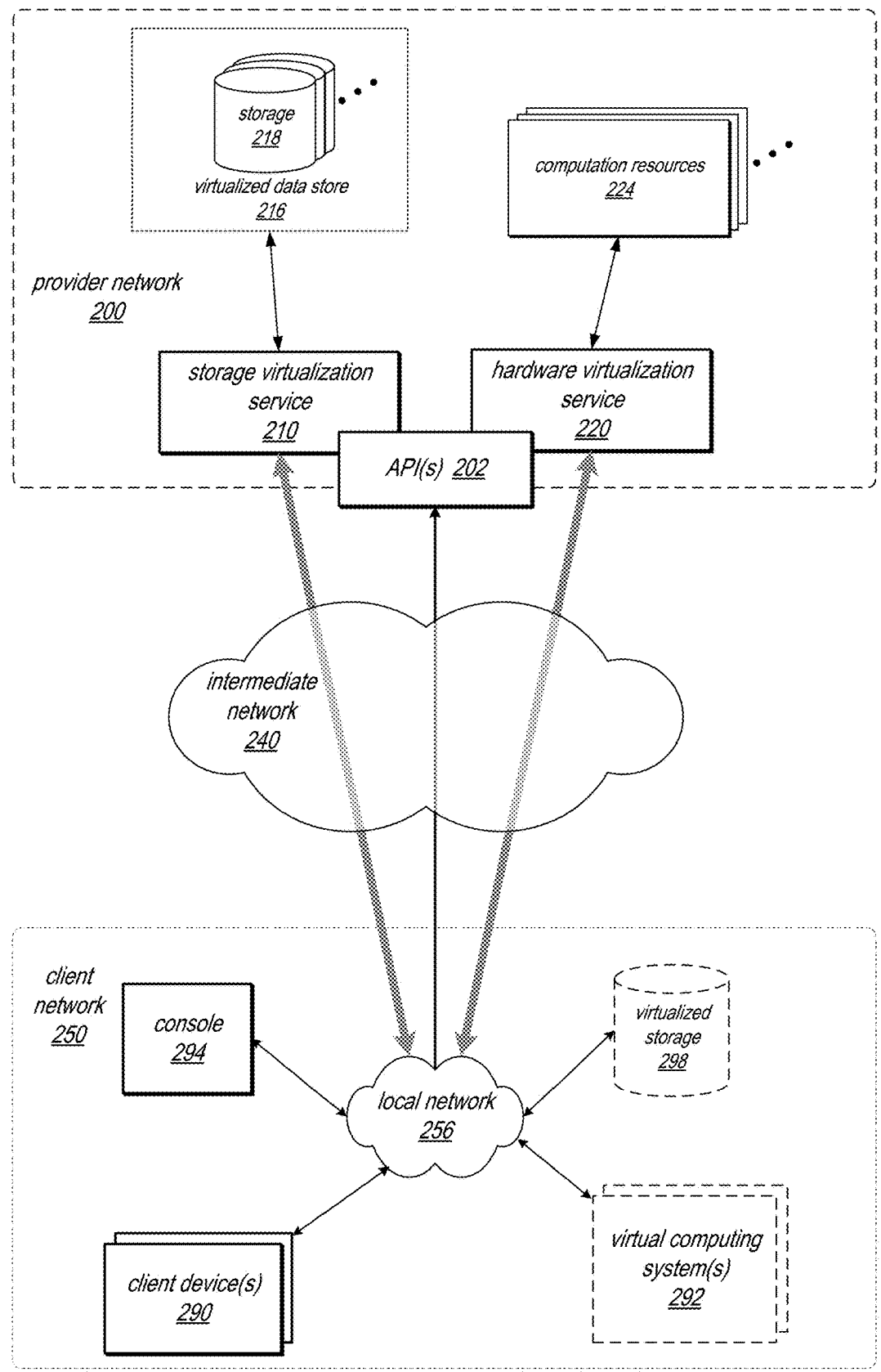
FIG. 2 is a block diagram illustrating an example provider network that provides a storage virtualization service and a hardware virtualization service to clients, according to at least some embodiments.

FIG. 2 is a block diagram of another example provider network environment, one that provides a storage virtualization service and a hardware virtualization service to clients, according to at least some embodiments. In this example, hardware virtualization service 220 provides multiple computation resources 224 (e.g., VMs) to clients. The computation resources 224 may, for example, be rented or leased to clients of the provider network 200 (e.g., to a client that implements client network 250). Each computation resource 224 may be provided with one or more private IP addresses. Provider network 200 may be configured to route packets from the private IP addresses of the computation resources 224 to public Internet destinations, and from public Internet sources to the computation resources 224.

Provider network 200 may provide a client network 250, for example coupled to intermediate network 240 via local network 256, the ability to implement virtual computing systems 292 via hardware virtualization service 220 coupled to intermediate network 240 and to provider network 200. In some embodiments, hardware virtualization service 220 may provide one or more APIs 202, for example a web services interface, via which a client network 250 may access functionality provided by the hardware virtualization service 220, for example via a console 294. In at least some embodiments, at the provider network 200, each virtual computing system 292 at client network 250 may correspond to a computation resource 224 that is leased, rented, or otherwise provided to client network 250.

From an instance of a virtual computing system 292 and/or another client device 290 or console 294, the client may access the functionality of storage virtualization service 210, for example via one or more APIs 202, to access data from and store data to a virtual data store 216 provided by the provider network 200. In some embodiments, a virtualized data store gateway (not shown) may be provided at the client network 250 that may locally cache at least some data, for example frequently accessed or critical data, and that may communicate with virtualized data store service 210 via one or more communications channels to upload new or modified data from a local cache so that the primary store of data (virtualized data store 216) is maintained. In at least some embodiments, a user, via a virtual computing system 292 and/or on another client device 290, may mount and access one or more storage volumes 218 of virtual data store 216, each of which appears to the user as local virtualized storage 298.

While not shown in FIG. 2, the virtualization service(s) may also be accessed from resource instances within the provider network 200 via API(s) 202. For example, a client, appliance service provider, or other entity may access a virtualization service from within a respective private network on the provider network 200 via an API 202 to request allocation of one or more resource instances within the private network or within another private network. Note that in some embodiments, the hardware virtualization service 220 may be configured to provide computation resources 224 that have been configured to implement a virtual desktop instance, which may appear to the user as a local desktop (implemented by a virtual computing system 292). Note also that in some embodiments, the computation resources 224 that are made available to the client via hardware virtualization service 220 may include multiple network interfaces. For example, at least some of them may include one network interface for communicating with various components of client network 250 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given access while using the virtual desktop instance. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 3:
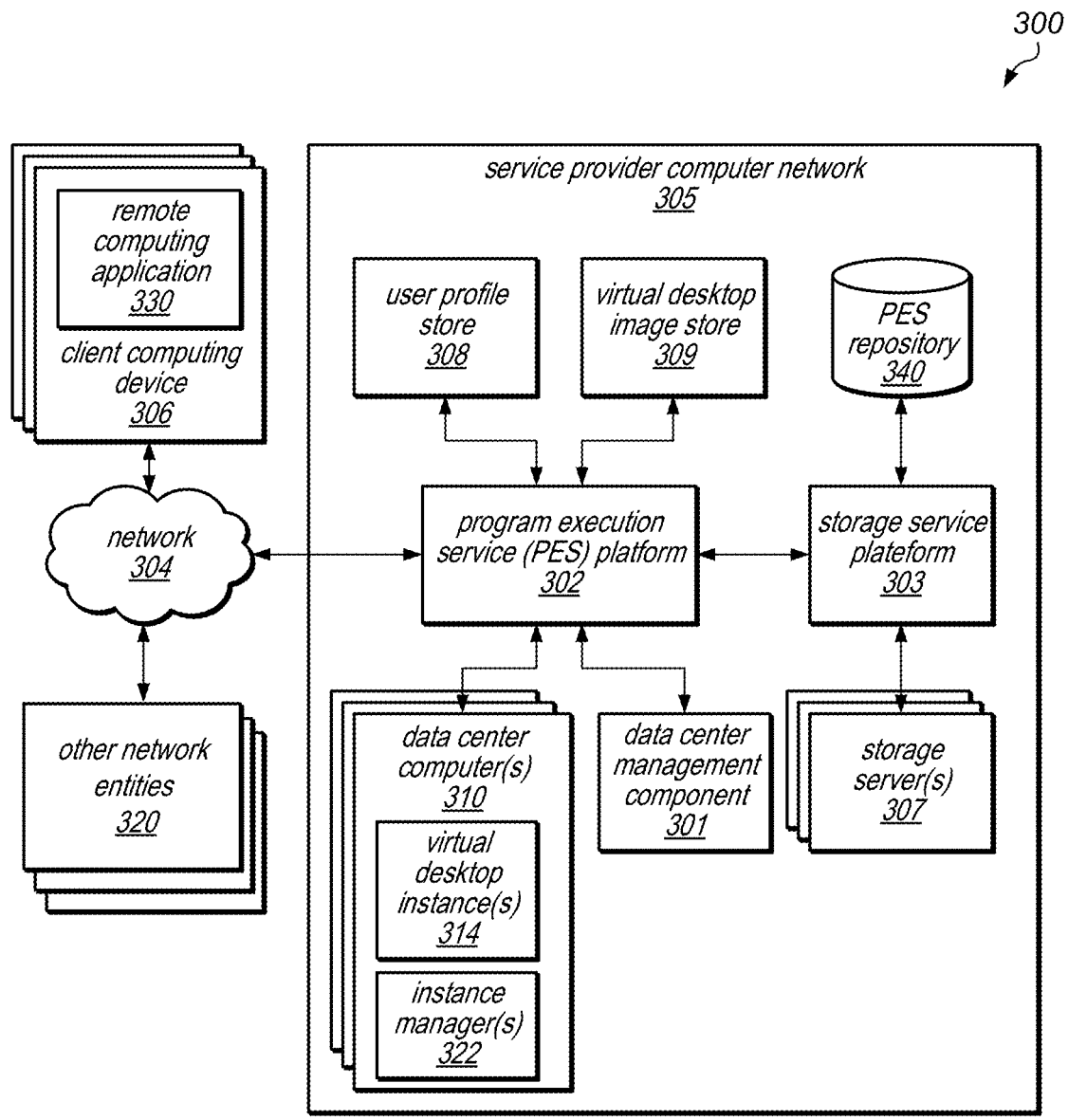
FIG. 3 is a block diagram illustrating a networked computing environment that includes a client computing device in communication with a service provider computer network, according to at least some embodiments.

FIG. 3 is a block diagram illustrating an example networked computing environment 300 that includes a client computing device 306 in communication with a service provider computer network 305 via the communication network 304. The client computing device 306 may be used for providing access to a remote operating system and applications to a user. In various embodiments, the client computing device 306 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 306 includes necessary hardware and software components for establishing communications over a communication network 304, such as a wide area network or local area network. For example, the client computing device 306 may be equipped with networking equipment and browser software applications that facilitate communications via the Internet or an intranet. The client computing device 306 may have varied local computing resources such as central processing units and architectures, memory, mass storage, graphics processing units, communication network availability and bandwidth, etc.

In one embodiment, the client computing device 306 may run a remote computing application 330. The remote computing application 330 may request access to a virtual desktop instance hosted by the service provider computer network 305. The remote computing application 330 may also manage the remote computing session between the client computing device 306 and the service provider computer network 305. As illustrated in FIG. 3, the service provider computer network 305 may also include a PES platform 302. The PES platform 302 illustrated in FIG. 3 corresponds to a logical association of one or more data centers associated with a service provider. The PES platform 302 may be associated with a number of data center computers, such as, for example, data center computers 310. Each data center computer 310 may host one or more virtual desktop instances 314. For example, the data center computer 310 may host a virtual desktop instance by executing a virtual machine on a physical device. The virtual machine may execute an instance of an operating system and application software to create a virtual desktop instance. Each virtual desktop instance executed by the PES 302 may be accessed by one or more client computing devices, such as client computing device 306.

In some embodiments, data center computers 310 may be associated with private network addresses, such as IP addresses, within the service provider computer network 305 such that they may not be directly accessible by the client computing devices 306. The virtual desktop instances 314 may be associated with public network addresses that may be made available by a gateway at the edge of the service provider computer network 305. Accordingly, the virtual desktop instances 314 may be directly addressable by client computing devices 306 via the public network addresses. One skilled in the relevant art will appreciate that each data center computer 310 would include physical computing device resources and software to execute the multiple virtual desktop instances 314 or to dynamically instantiate virtual desktop instances 314. Such instantiations can be based on a specific request, such as from the client computing device 306.

As illustrated in FIG. 3, the data center computers 310 may include one or more instance managers 322. The instance managers 322 may be on the same computer as the respective instances 314, or on a separate computer. The instance managers 322 may track progress of the instances executed on the data center computers 310, monitor and coordinate the storage of data created by the user while interacting with the instances 314 via the client computing devices, and monitor the overall health and state of the data center computers 310 and of the remote computing applications running on the client computing devices 306. The instance managers 322 may communicate information collected through tracking and monitoring with the data center management component 301 of the PES platform 302 in order to efficiently manage the various remote computing sessions between the data center computers 310 and the client computing devices 306.

As illustrated in FIG. 3, the service provider network 305 may also include a storage service platform 303. The storage service platform 303 may include, or be connected to, one or more storage servers 307. The storage servers 307 may be used for storing data generated or utilized by the virtual desktop instances 314. The data generated or utilized by the virtual desktop instances 314 may be based on the interaction between the client computing devices 306 and the PES 302 via one or more remote computing sessions.

In some embodiments, the storage service platform 303 may logically organize and maintain information associated with a hosted virtual desktop instance 314 in a desktop store. The information associated with a virtual desktop instance 314 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 305 may be able to mitigate the effect of failures of the data center computer(s) 310 running the virtual desktop instances 314 or errors associated with the execution of virtual desktop instances 314 on the data center computer(s) 310 by storing data on storage servers independent from the data center computers 310. Additionally, the service provider network 305 may also facilitate client interaction with multiple virtual desktop instances 314 by maintaining the information in the desktop stores. In some embodiments, if one virtual desktop instance 314 fails, a new instance may be launched and attached to the same desktop store that was previously attached to the virtual desktop instance 314 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 314 loses its connection to the desktop store, the PES 302 may switch the connection of the virtual desktop instance 314 from the desktop store to the back-up desktop store.

As illustrated in FIG. 3, the PES platform 302 may also include a central storage device such as a PES repository 340 for storing data stored by the various desktop stores and backup stores on storage servers 307. The data center computers 310 and the storage servers 307 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 305 may include a user profile store 308. The user profile store 308 may be used to store, for example, various programs a user is given access to while using a virtual desktop instance 314. The user profiles stored may also indicate a maximum time or cost associated with the remote computing sessions of different users. The PES platform 302 may take user profiles into consideration when placing, configuring, and/or managing virtual desktop instances 314. The PES platform 302 may also include, or be connected to, a virtual desktop image store 309. The virtual desktop image store 309 may include template images of operating systems without customizations applied per user profiles.

In some embodiments, data center computers 310 and storage servers 307 may be considered to be logically grouped, regardless of whether the components, or portions of the components, are physically separate. For example, a service provider computer network 305 may maintain separate locations for providing the virtual desktop instances 314 and the storage components. Additionally, although the data center computers 310 are illustrated in FIG. 3 as logically associated with a PES platform 302, the data center computers 310 may be geographically distributed in a manner to best serve various demographics of its users. Additionally, one skilled in the relevant art will appreciate that the service provider computer network 305 may be associated with various additional computing resources, such additional computing devices for administration of content and resources, and the like. For example, the service provider computer network 305 (and/or various ones of the virtual desktop instances 314 implemented thereon) may be configured to communicate with other network entities 320 over communication network 304 or over another communication network (e.g., at least some of the virtual desktop instances 314 may include a network interface usable to access one or more other network entities 320 that is separate and distinct from to a network interface that is usable to communicate with client computing device 306). These other network entities 320 may include, for example, other client networks or computing devices thereof, computing systems that provide resources for servicing requests received from client computing device 306, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 330. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 302 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 3 above. In some embodiments, the remote computing application 330 may request that a virtual desktop session be opened on behalf of the client, in response to which a virtual desktop instance 314 may be instantiated, configured for the use of the client, and/or connected to the client computing device 306 over network 304 (e.g., via one of two network interfaces of the virtual desktop instance 314).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 4 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 4 illustrates an example data center (e.g., one that implements an overlay network on a network substrate using IP tunneling technology), according to at least some embodiments. As illustrated in this example, a provider data center 400 may include a network substrate that includes networking devices 412 such as routers, switches, network address translators (NATs), and so on. At least some embodiments may employ an Internet Protocol (IP) tunneling technology to provide an overlay network via which encapsulated packets may be passed through network substrate 410 using tunnels. The IP tunneling technology may provide a mapping and encapsulating system for creating an overlay network on a network (e.g., a local network in data center 400 of FIG. 4) and may provide a separate namespace for the overlay layer (the public IP addresses) and the network substrate 410 layer (the private IP addresses). Packets in the overlay layer may be checked against a mapping directory (e.g., provided by mapping service 430) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 430) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 4, an example overlay network tunnel 434A from a virtual machine (VM) 424A on host 420A to a device on the intermediate network 440 (e.g., a computing system 470, a computing system 452 on local network 450, or a data center 46), and an example overlay network tunnel 434B between a VM 424B on host 420B and a VM 424A on host 420A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for securing workspaces in a cloud computing environment may be implemented may include hardware virtualization technology that enables multiple operating systems to run concurrently on a host computer (e.g., hosts 420A and 420B of FIG. 4), i.e. as virtual machines (VMs) 424 on the hosts 420. The VMs 424 (some of which may be configured to implement a virtual desktop instance for the use of a client) may, for example, be rented or leased to clients of a network provider. A hypervisor, or virtual machine monitor (VMM) 422, on a host 420 may serve as an instance manager for the VMs 424 and/or other virtualized resource instances on the hosts 420, which may include presenting the VMs 424 on the host with a virtual platform and monitoring the execution of the VMs 424. Each VM 424 may be provided with one or more private IP addresses; the VMM 422 on a host 420 may be aware of the private IP addresses of the VMs 424 on the host. A mapping service 430 may be aware of all network IP prefixes and the IP addresses of routers or other devices serving IP addresses on the local network. This includes the IP addresses of the VMMs 422 serving multiple VMs 424. The mapping service 430 may be centralized, for example on a server system, or alternatively may be distributed among two or more server systems or other devices on the network. A network may, for example, use the mapping service technology and IP tunneling technology to, for example, route data packets between VMs 424 on different hosts 420 within the data center 400 network; note that an interior gateway protocol (IGP) may be used to exchange routing information within such a local network.

In addition, a network such as the provider data center 400 network (which is sometimes referred to as an autonomous system (AS)) may use the mapping service technology, IP tunneling technology, and routing service technology to route packets from the VMs 424 to Internet destinations, and from Internet sources to the VMs 424. Note that an external gateway protocol (EGP) or border gateway protocol (BGP) is typically used for Internet routing between sources and destinations on the Internet. FIG. 4 shows an example provider data center 400 implementing a network that provides resource virtualization technology and that provides full Internet access via edge router(s) 414 that connect to Internet transit providers, according to at least some embodiments. The provider data center 400 may, for example, provide clients the ability to implement virtual computing systems (VMs 424) via a hardware virtualization service (such as hardware virtualization service 220 in FIG. 2) and the ability to implement virtualized data stores 416 on storage resources 418 via a storage virtualization service (such as storage virtualization service 210 in FIG. 2).

In some embodiments, the data center 400 network may implement IP tunneling technology, mapping service technology, and a routing service technology to route traffic to and from virtualized resources, for example to route packets from the VMs 424 on hosts 420 in data center 400 to Internet destinations, and from Internet sources to the VMs 424. Internet sources and destinations may, for example, include computing systems 470 connected to the intermediate network 440 and computing systems 452 connected to local networks 450 that connect to the intermediate network 440 (e.g., via edge router(s) 414 that connect the network 450 to Internet transit providers). The provider data center 400 network may also route packets between resources in data center 400, for example from a VM 424 on a host 420 in data center 400 to other VMs 424 on the same host or on other hosts 420 in data center 400. In some embodiments, at least some of the VMs 424 may include two or more network interfaces. For example, they may include one network interface usable for communications between VMs 424 and the clients on whose behalf VMs 424 are hosted by the provider and a second (separate and distinct) network interface that is usable to access external resources, computing systems, data centers, or Internet destinations on networks other than the provider network and the client network, either or both of which may employ an IP tunneling technology, as described herein.

A service provider that provides data center 400 may also provide additional data center(s) 460 that include hardware virtualization technology similar to data center 400 and that may also be connected to intermediate network 440. Packets may be forwarded from data center 400 to other data centers 460, for example from a VM 424 on a host 420 in data center 400 to another VM on another host in another, similar data center 460, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 418, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 424 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

Figure 5:
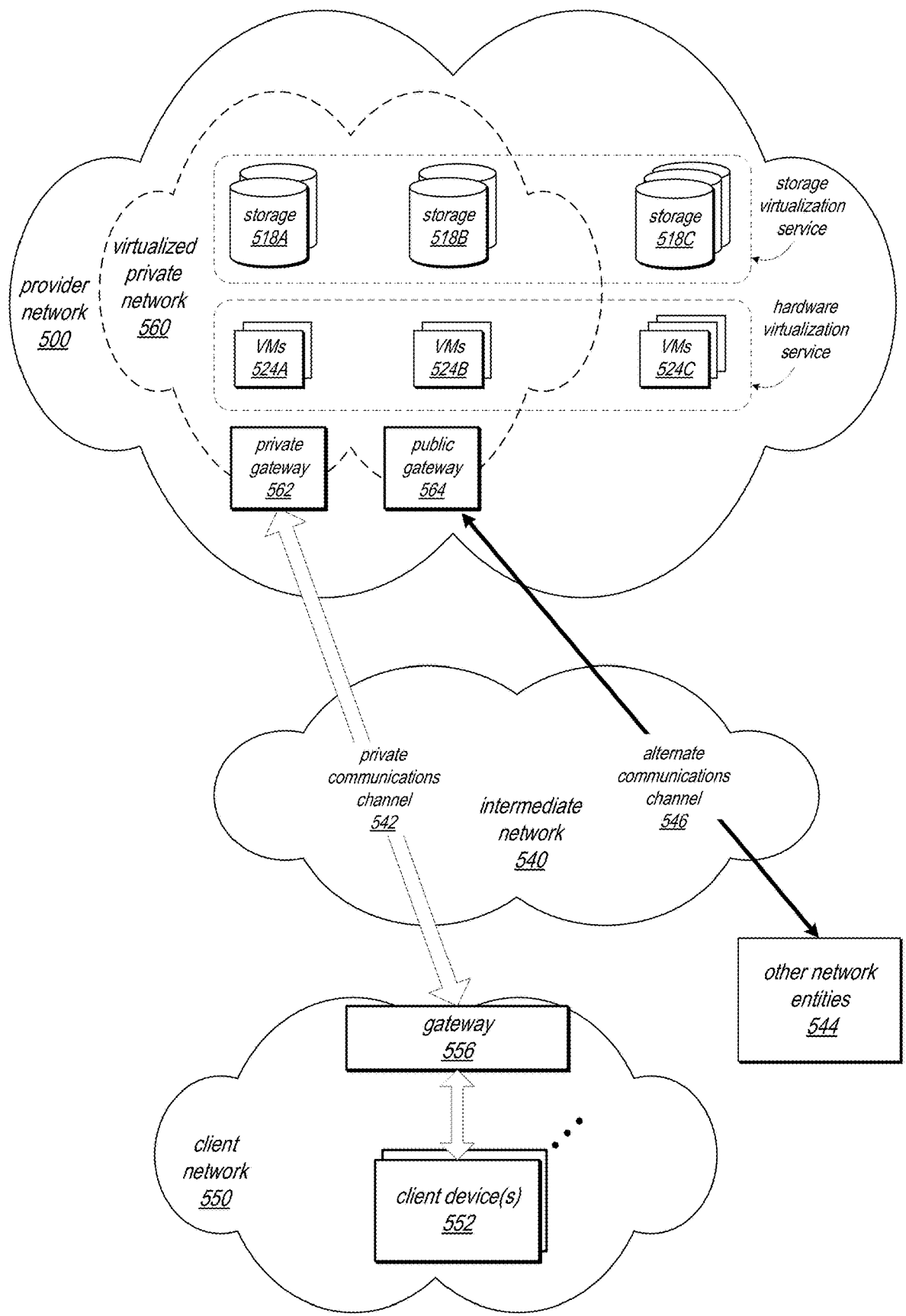
FIG. 5 is a block diagram illustrating an example provider network that provides private networks to clients, according to at least some embodiments.

FIG. 5 illustrates an example provider network that provides private networks on the provider network to at least some clients, according to at least some embodiments. A client's virtualized private network 560 on a provider network 500, for example, may enable a client to connect their existing infrastructure (e.g., client devices 552) on client network 550 to a set of logically isolated resource instances (e.g., VMs 524A and 524B and storage 518A and 518B), and to extend management capabilities such as security services, firewalls, and intrusion detection systems to include their resource instances.

In some embodiments, a client's virtualized private network 560 may be connected to a client network 550 via a private communications channel 542. A private communications channel 542 may, for example, be a tunnel implemented according to a network tunneling technology or some other peering connection over an intermediate network 540. The intermediate network may, for example, be a shared network or a public network such as the Internet. Alternatively, a private communications channel 542 may be implemented over a direct, dedicated connection between virtualized private network 560 and client network 550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 560 for a client on provider network 500, one or more resource instances (e.g., VMs 524A and 524B and storage 518A and 518B) may be allocated to the virtualized private network 560. Note that other resource instances (e.g., storage 518C and VMs 524C) may remain available on the provider network 500 for other client usage. A range of public IP addresses may also be allocated to the virtualized private network 560. In addition, one or more networking devices (routers, switches, etc.) of the provider network 500 may be allocated to the virtualized private network 560. A private communications channel 542 may be established between a private gateway 562 at virtualized private network 560 and a gateway 556 at client network 550.

In at least some embodiments, in addition to, or instead of, a private gateway 562, virtualized private network 560 may include a public gateway 564 that enables resources within virtualized private network 560 to communicate directly with entities (e.g., network entity 544) via intermediate network 540, and vice versa, instead of or in addition to via private communications channel 542.

In some embodiments, virtualized private network 560 may be, but is not necessarily, subdivided into two or more subnets (not shown). For example, in implementations that include both a private gateway 562 and a public gateway 564, the private network may be subdivided into a subnet that includes resources (VMs 524A and storage 518A, in this example) reachable through private gateway 562, and a subnet that includes resources (VMs 524B and storage 518B, in this example) reachable through public gateway 564. In other embodiments, one or more of the VMs 524 may be configured to access client network 550 over a private communications channel 542 through private gateway 562 (e.g., via a network interface that is configured for communication between the VM 524 and a client device 552) and to access other network entities 544 over an alternate communications channel 546 through public gateway 564 (e.g., via a network interface that is configured for communication between the VM 524 and external resources, computing systems, data centers, or Internet destinations on networks other than the provider network 500 and the client network 550, either or both of which may employ an IP tunneling technology, as described herein). In still other embodiments, private and/or public gateways and communication channels (including a private gateway 562, public gateway 564, private communications channel 542, alternate communications channel 546, and/or intermediate network 540) may be used in any of a variety of different combinations for communication between VMs 524, client network 550, and other network entities 544.

In some embodiments, the client may assign particular client public IP addresses to particular resource instances in virtualized private network 560. A network entity 544 on intermediate network 540 may then send traffic to a public IP address published by the client; the traffic is routed, by the provider network 500, to the associated resource instance. Return traffic from the resource instance may be routed, by the provider network 500, back to the network entity 544 over intermediate network 540. Note that routing traffic between a resource instance and a network entity 544 may require network address translation to translate between the public IP address and the private IP address of the resource instance.

At least some embodiments may allow a client to remap public IP addresses in a client's virtualized private network 560 as illustrated in FIG. 5 to devices on the client's external network 550. When a packet is received (e.g., from network entity 544), the network 500 may determine that the destination IP address indicated by the packet has been remapped to an endpoint on external network 550 and handle routing of the packet to the respective endpoint, either via private communications channel 542, alternate communications channel 546, or intermediate network 540. Response traffic may be routed from the endpoint to the network entity 544 through the provider network 500, or alternatively may be directly routed to the network entity 544 by the client network 550. From the perspective of the network entity 544, it may appear as if the network entity 544 is communicating with the public IP address of the client on the provider network 500. However, the network entity 544 may actually be communicating with the endpoint on client network 550.

While FIG. 5 shows network entity 544 on intermediate network 540 and external to provider network 500, in other embodiments, a network entity may be an entity on provider network 500. For example, one of the resource instances provided by provider network 500 may be a network entity that sends traffic to a public IP address published by the client. In some embodiments, this traffic may be sent via a network interface of a VM 524 that is separate and distinct from a network interface over which traffic between the VM 524 and client network 550 is sent.

Virtual Desktop Instances

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances (which may also be referred to as "virtual workspaces" or simply "workspaces"), and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual workspace environment. Although the virtual workspace environment is implemented by virtualized resource instances in the cloud computing environment, it may appear to the end user as if it were a local desktop and it may operate as if it were an independent computer to which the user is connected. In some embodiments, the virtual workspace environment may provide access to productivity software and other software programs to which the user would typically have access if the user were logged onto a physical computer owned by the organization or enterprise.

In some embodiments, these virtual workspaces may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual workspaces (and/or the applications running thereon) may be part of the active directory framework of the organization or enterprise and may be able to access shared files or other resources on the existing network of the organization or enterprise once the credential presented by the user upon logging into the virtual workspace have been authenticated.

In some embodiments, each virtual desktop instance instantiated on a service provider network may include two (or more) network interfaces, each used for a specific purpose. In some embodiments, these virtual network interfaces may be controlled based on user intent and/or any of a variety of applicable policies (e.g., default policies of the service provider, customer-specific policies, or application-specific policies). One of the interfaces (sometimes referred to herein as the "E0" interface) may be configured to accept incoming end-user requests to start an interactive video stream (e.g., to connect to the virtual desktop instance). Once the request is accepted, this interface may be used as the interface for the video stream to the end user. For example, images depicting the user interface of an application or operating system executing on the virtual desktop instance (e.g., the output of the application or operating system such as a graphical user interface, sound, etc.) may be streamed to the client computing device and presented to the user (e.g., the images depicting the graphical user interface may be rendered on a display of the client computing device). The other network interface (sometimes referred to herein as the "E1" interface) may be used to send end-user web traffic (such as browser requests) from the virtual desktop instance to various Internet destinations and/or to connect to shared resources on the internal network of the organization or enterprise on whose behalf the virtual desktop instance was instantiated. For example, in some embodiments, the E1 interface of a virtual desktop instance may be part of a virtual private cloud (VPC) that has a connection to the internal network of the customer (e.g., the organization or enterprise on whose behalf the virtual desktop instances were instantiated). Thus, the virtual desktop instance may be joined to the customer's domain, and may have access to customer's web servers, including any shared applications and/or data.

In some embodiments, the first network interface of each virtual desktop instance (the E0 interface) may be completely controlled by the service provider. For example, in some embodiments, the only traffic allowed on that interface may be the video stream that is sent to the end user and traffic related to management functions that are under the control of the service provider. The second interface (the E1 interface) may not be used directly by the end user of the virtual desktop instance, but may provide a network connection for the virtualized computing resource instance that is hosting the virtual desktop instance that is separate from the connection used for the video stream and that allows the virtual desktop instance (or applications or processing executing thereon) to access other networks and network entities on other networks. In some embodiments, the E0 interface may be used to communicate the commands to launch a browser application on the virtual desktop instance, but the communications out to the Internet from that browser application may take place over the E1 interface.

As previously noted, in some embodiments, the systems described herein may implement a virtual private cloud (VPC) for a workspace service that extends out to access gateways in multiple, geographically distributed point of presence (POP) locations. In various embodiments, gateway components may serve as bridges along the path between virtual desktop instances (workspaces) that generate pixel streams and the client devices that receive the streams. In some embodiments, such paths may be used to carry commands that are communicated to the client devices from the virtual desktop instances and that represent instructions directing the client devices to generate and/or render pixels for display by the client devices (e.g., instead of or in addition to pixel streams). In one example, data representing text or graphics to be displayed by a client device may be sent from a virtual desktop instance to the client device as a pixel stream. However, if a video is to be displayed by the client device, the virtual desktop instance may send a link to the client device that is usable in locating and accessing the video, along with a command indicating that the client device should render the video for display. In other embodiments, data representing graphics processing commands may be communicated to the client devices from the virtual desktop instances, which may cause the client device to generate and render pixels for display on the client device.

In some embodiments, the same gateways may also bridge an overlapping return path that carries data representing user interactions with the virtual desktop instances (e.g., keyboard, touch screen/pad, and/or mouse events) from the client devices back to the virtual desktop instances. On egress from the service provider, these access gateways may be the last points that are controlled by the service before the pixel stream is carried over a public network (e.g., before it enters the public Internet). By moving the gateways closer to the client devices, while retaining control over them as part of the VPC of the workspace service, a higher quality connection and/or end-user experience may be provided by the service. For example, a secure, reliable, low latency high bandwidth, low loss, and/or low jitter connection (e.g., over a virtual private network) may be used to carry the two-way interactive video streams for virtual desktop sessions up to a point as close to the client devices as possible before switching to a potentially less-reliable, higher latency public network connection between the gateway components and the client devices.

In some embodiments, the gateway components may be multi-tenant access gateways that provide the gateway functionality for multiple different workspace clients (e.g., different customers or service subscribers) on whose behalf virtual desktop instances are hosted by the service. Note that in some embodiments, the gateway components may only be involved in the delivery of interactive video streams for virtual desktop sessions, and not for other types of traffic between virtual desktop instances and client devices (e.g., for other purposes, such as security, authentication, or directory services) or for traffic between virtual desktop instances and other network entities on behalf of workspace clients. Instead, these other types of traffic (which are typically not as time-sensitive or as sensitive to various network effects as are interactive video streams) may be carried through other interfaces to the virtual desktop instances (e.g., via an E1 type interface, as described above).

As previously noted, virtual computing resources instances that are configured as virtual desktop instances may be hosted on computing nodes in multiple data centers that are distributed across multiple availability zones. Similarly, gateway components of the workspace service (which may also be implemented by virtual computing resources) may be hosted on computing nodes at point of presence (POP) locations that are geographically distributed. As described in more detail below, in some embodiments, the service may automatically assign a gateway component for a particular client (e.g., a particular end user). When the client attempts to sign in to the workspace service, the service may provide an access gateway address that is hosted in the same region (e.g., the region in which the client is physically located) and may perform the mapping to that gateway component from the virtual desktop instance.

As described herein, in some embodiments, the gateway components participate within a multi-tenant VPC that is managed by the workspace service and that is common for all clients (e.g., customers or service subscribers). This VPC may serve as the management network for the workspace service, and may also serve as the network that carries the interactive video traffic out to the gateway components at various POP locations (e.g., over a virtual private network). The workspace service may provide client-specific VPCs, and the virtual computing resources instances created and managed on behalf of each client may participate in one of these VPCs. For example, these client-specific VPCs may be created (or their created may be initiated) by clients themselves or they may be created by the service on their behalf. These client VPCs may carry the network traffic other than the interactive video stream of a virtual desktop session (e.g., network traffic for operations such as joining a domain or allowing the end user to browse an Internet site). In some embodiments, a component of the virtual computing resources that implement a virtual desktop instance may also be attached to (or participate in) the VPC of the workspace service (i.e., the management network for the service).

As described in more detail below, in some embodiments, the interactive video stream may be communicated over the UDP network protocol and may run on a specific port (e.g., port 4172). However, this is a network protocol and port that may not generally be opened on a customer's firewall. Another port that may generally be opened on a customer's firewall is TCP 443, which is a secure TCP port. In some embodiments, a gateway component may be placed in a customer's unsecured (or DMZ) network that is configured to convert from UDP to TCP 443, so that the customer does have to open up any additional ports on their firewall to receive the interactive video stream. In such embodiments, the end user may reap the benefits of UDP (which is a very efficient delivery protocol for real-time traffic, such as the interactive video stream, without the overhead of TCP) up to their on-premises network and then may convert the stream to TCP 443 at the end. For example, a local process (a local gateway) running on the client device may receive the UDP traffic from the workspace gateway component and then (just on the unsecured side of the customer's firewall) may convert it to TCP for port 443.

Figure 6:
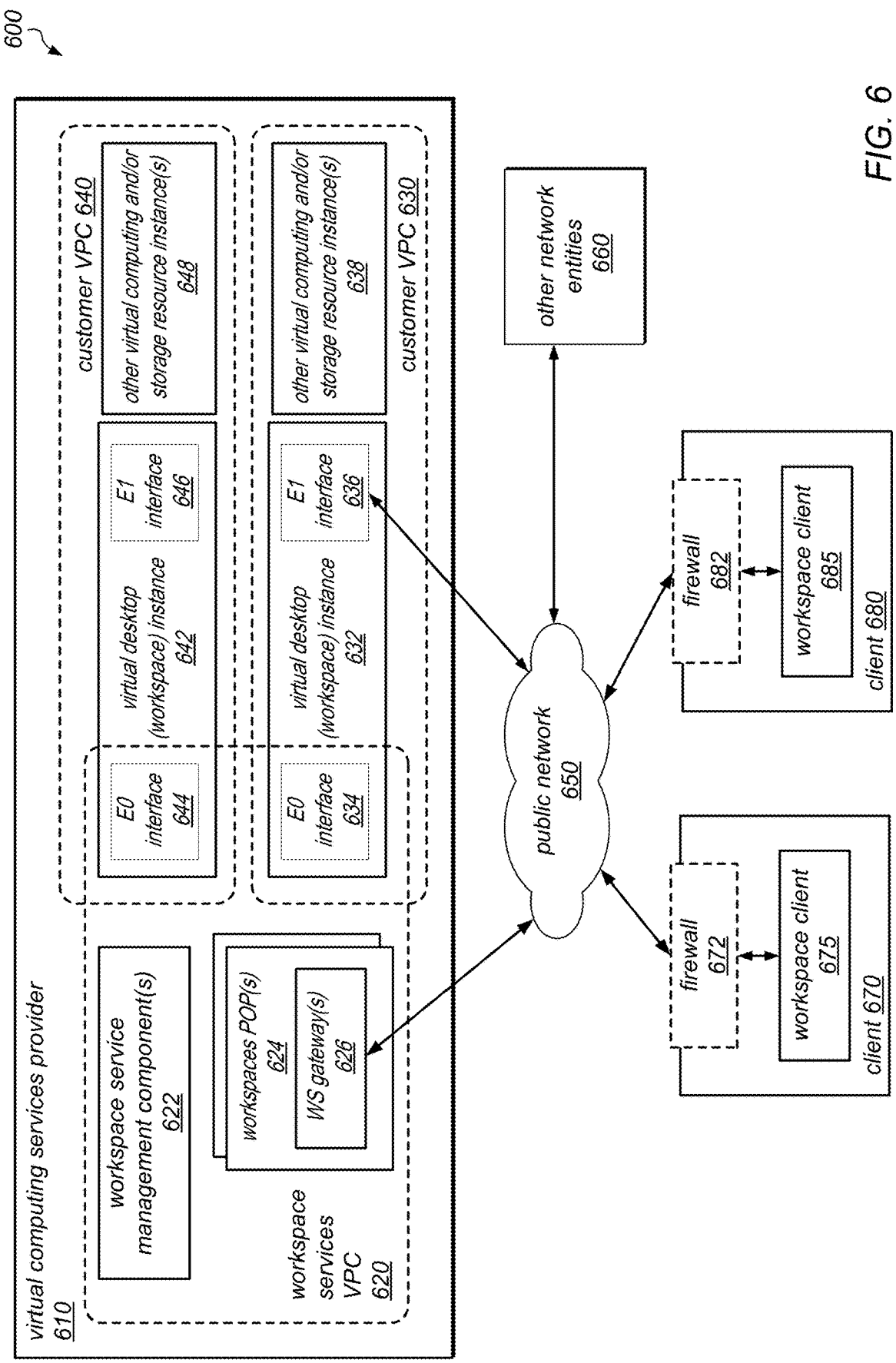
FIG. 6 is a block diagram illustrating an example networked environment in which virtual desktop services are provided to clients, according to at least some embodiments.

The techniques described herein for providing low latency connections to workspaces in a cloud computing environment may be further illustrated in FIGS. 6-11 and by way of the example embodiments described below. For example, FIG. 6 is a block diagram illustrating an example networked environment in which virtual desktop services are provided to clients, according to at least some embodiments. As illustrated in this example, the networked computing environment 600 may include a virtual computing services provider 610 in communication with two client computing devices 670 and 680 and with other network entities 660 at least partially over public network 650. The virtual computing services provider 610 may include multiple virtual computing resource instances, some of which are configured as virtual desktop (workspace) instances, such as virtual desktop (workspace) instances 632 and 642. These virtual desktop (workspace) instances may be used to host virtual desktop sessions on behalf of clients. In some embodiments, other virtual computing resource instances (e.g., instances of a virtual machine, as described above) may be configured for hosting applications, such as data streaming applications. Any of these virtual computing resource instances may include physical computing device resources and software to provide the multiple instances of a virtual machine or to dynamically cause the creation of instances of a virtual machine. Such creation can be based on a specific request, such as from a client computing device, or the workspace service (or a workspace service management component thereof) may initiate dynamic creation of an instance of a virtual machine on its own. Note that each virtual computing resource instance may include one or more storage devices for storing any type of data used in the delivery and processing of network or computing resources, including but not limited to user data, state information, processing requirements, historical usage data, and resources from content providers that will be processed by one or more of the virtual computing resource instances and transmitted to various client computers, in some embodiments. In some embodiments, one or more virtual computing resource instances (or other components within the workspace services VPC 620 and/or within each of the customer VPCs 630 or 640) may include additional software and/or hardware components that facilitate communications including, but not limited to, load balancing or load sharing software/hardware components.

As illustrated in this example, virtual desktop (workspace) instance 632 and one or more other computing and/or network storage resource instances 638 may operate (participate) within a virtual private cloud 630 on the physical resources of virtual computing services provider 610 on behalf of a client and may communicate with each other over a virtual private network (VPN). Similarly, virtual desktop (workspace) instance 642 and one or more other computing and/or network storage resource instances 648 may operate within a virtual private cloud 640 on the physical resources of virtual computing services provider 610 on behalf of a client (e.g., the same client or a different client) and may communicate with each other over a virtual private network (VPN). As described herein, each of these virtual desktop (workspace) instances may include two separate and distinct network interfaces that serve different purposes. For example, virtual desktop (workspace) instance 632 includes E0 interface 634 for communicating with clients (e.g., via one of workspace gateways 626) and E1 interface 636 for communicating with other network entities 660, while virtual desktop (workspace) instance 642 includes E0 interface 644 for communicating with clients (e.g., via one of workspace gateways 626) and E1 interface 646 for communicating with other network entities 660.

As illustrated by the example in FIG. 6, virtual computing services provider 610 may include a number of "point of presence" (or "POP") locations 624 that correspond to edge nodes within a virtual private cloud for the workspace services, shown as workspace services VPC 620. In general, a point of presence is a physical location at which one or more physical computing nodes (e.g., servers, routers, switches, and/or other components) are configured to serve as an access point to the Internet. The virtual computing services provider 610 may also include one or more workspace service management components 622 that operate within workspace services VPC 620, each of which manages computing resource instances that implement virtual desktop instances (workspaces) on behalf of clients. For example, in some embodiments, workspace service management components 622 may include computing resources for establishing connections between various virtual desktop (workspace) instances and/or other virtual computing resource instances and the clients on whose behalf the virtual computing services provider hosts these resource instances. In some embodiments, workspace service management components 622 may include computing resources for administration of content and resources, and the like. As illustrated in this example, the E0 interfaces of virtual desktop instances 630 and 640 (shown as 634 and 644) may operate within workspace services VPC 620 as well as within customer VPC 630 and 640, respectively.

As illustrated in this example, each workspaces POP location 624 may include one or more workspaces gateway components 626, through which clients communicate with a virtual desktop (workspace) instance. Each workspaces POP location 624 may include a DNS component for resolving DNS queries from the client computers 670 and 680 and/or a resource cache component for storing resources from content providers and transmitting various requested resources to various client computers (not shown). In some embodiments, these components (or other components within each of the workspaces POP locations 624) may include additional software and/or hardware components that facilitate communications including, but not limited to, load balancing or load sharing software/hardware components. Note that the workspace service management components 622 and various components of the workspaces POP locations 624 (including workspace gateway components 626) may be considered to be logically grouped (and may interoperate with each other within workspaces services VPC 620 and communicate with each other over a virtual private network), regardless of whether the components, or portions of the components, are physically separate. For example, the workspace service management components 622 and various components of the workspaces POP locations 624 may be geographically distributed throughout the networked environment 600 in a manner to best serve various demographics of client computing devices (such as clients 670 and 680). Additionally, one skilled in the relevant art will appreciate that the CDN service provider 106 can be associated with various additional computing resources, such as additional computing devices for administration of content and resources, and the like. In various embodiments, the virtual desktop (workspace) instances 632 and 642 may be management using the same or different components than the components that manage other types of virtual computing resource instances (e.g., other virtual computing and/or storage resource instances 638 or 648) on behalf of clients.

As illustrated in this example, each client that receives virtual computing and/or storage services from virtual computing services provider 610 (e.g., virtual desktop services) may include a client-side component of the workspace service that executes on the client device. In some embodiments, this client-side component of the workspace service may operate behind a firewall component of the client. For example, client 670 includes a workspace service client component 675 that operates behind a firewall 672, and client 680 includes a workspace service client component 685 that operates behind a firewall 682. For example, interactive video traffic may be communicated between one of clients 670 or 680 and a virtual desktop instance (e.g., virtual desktop instance 632 or 642) through one of the workspace gateway components 626 at a workspace POP location 624 and through the E0 network interface of the virtual desktop instance (e.g., E0 interface 634 or 644). In some embodiments, the workspace service may provide (and control) the streaming of the interactive video stream over a secure, reliable, and low latency connection from the virtual desktop instances to the gateway components at POP locations, but not beyond. In other words, the gateway components at workspace POP locations may represent the last point in the connection between the virtual desktop instance and the client at which the communication is controlled by the workspace service before being carried over a less reliable and/or higher latency public network to reach its final destination (the client). However, by locating gateway components of the workspace service closer to client devices, the contribution of such public networks on the performance of the service when delivering an interactive video stream may be reduced.

As described herein, in some embodiments, a virtual private cloud of a workspaces service may be extended to include gateway components in workspaces point of presence locations that may be geographically distributed across a networked environment. One example of a networked environment in which gateway components at point of presence locations operate (participate) within a virtual private cloud of a virtual desktop (workspace) service and communicate with each other (and with other components of the workspace service) over a virtual private network (VPN) is illustrated by the block diagram in FIG. 7A, according to at least some embodiments. In this example, networked environment 700 includes at least two availability zones or regions. As noted above, each availability zone/region may include its own physically distinct, independent infrastructure on which a collection of computing nodes are implemented (e.g., within one or more data centers). In some embodiments, each availability zone/region may reside in a different geographic location or region, while in other embodiments multiple availability zones/region may reside in the same geographic location or region. In this example, networked environment 700 includes an availability zone or region 710 that includes a data center 712, and data center 712 hosts one or more workspace instances 714 and/or workspace management components 716 (e.g., on one or more computing nodes within data center 712). Similarly networked environment 700 includes an availability zone or region 720 that includes a data center 722, and data center 722 hosts one or more workspace instances 724 and/or workspace management components 726 (e.g., on one or more computing nodes within data center 722).

As described above, one or more workspace instances (including any and all virtual computing and/or storage resources that implement the workspace instances) may operate within a customer VPC in the respective data center in which it is hosted and some or all of the workspace instances (e.g., workspace instances 714 and/or 724) may include two separate and distinct network interfaces, such as the E0 and E1 interfaces described herein (not shown).

Figure 7A:
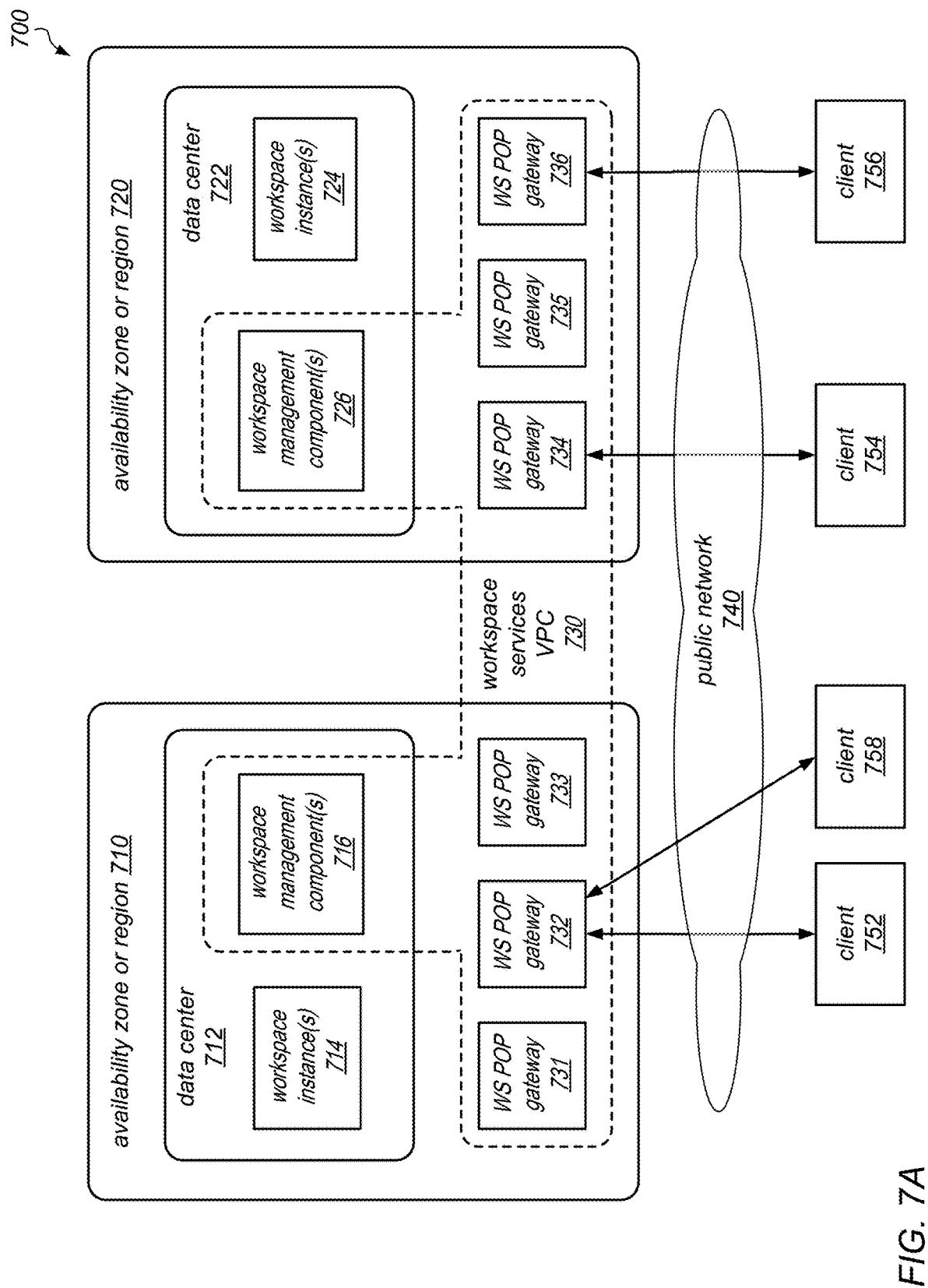
FIG. 7A is a block diagram illustrating an example networked environment in which gateway components at point of presence locations operate within a virtual private cloud of a virtual desktop service, according to at least some embodiments.

As illustrated in FIG. 7A, workspace management components 716 and 726, which are located in different availability zones or regions, may operate within workspace services VPC 730, and may provide functionality for creating and/or configuring virtual desktop instances, selecting gateway components through which interactive video streams are communicated between virtual desktop instances and clients, establishing connections between virtual desktop instances and clients and/or performing other administrative or communication functions of the workspace service. In addition, multiple workspace point of presence (POP) gateway components (shown as WS POP gateway components 731-736), although they are distributed between the two availability zones/regions 710 and 720, may operate within workspace services VPC and may interoperate with other components of the workspace service (e.g., over a VPN) within the workspace services VPC 730. In some embodiments, the E0 interfaces of any or all of workspace instances 714 and/or 724 may also interoperate with workspace management components 716 and/or 726, and/or with any of WS POP gateway components 731-736 within workspace services VPC 730 (not shown). As illustrated in this example, some or all of the workspace POP gateway components of a workspace service may be located outside of the data centers that host workspace instances on behalf of clients. In other embodiments, some or all of the workspace POP gateway components of a workspace service may be located within the data centers that host workspace instances on behalf of clients. Note that, in various embodiments, there may be two or more data centers in each availability zone or region, each of which may include multiple computing nodes that host respective workspace instances.

In some embodiments, clients may access their workspaces (i.e., workspace instances that are created and managed by the workspace service on behalf of the clients) by connecting through nearby workspace gateway components (e.g., workspace gateway components at point of presence locations near the clients). However, these gateway components may not necessarily be hosted in the data center or availability zone/region in which their workspace instances are hosted. In the example illustrated in FIG. 7A, four clients (e.g., clients 752, 754, 756, and 758) may access various workspace instances (e.g., various ones of workspace instances 714 hosted in data center 712 within availability zone/region 710 or various ones of workspace instances 724 hosted in data center 722 within availability zone/region 720) through various ones of WS POP gateway components 731-726. Here, clients 752, 754, 756, and 758 may connect to (and communicate with) any of these workspace POP gateway components over a public network such as the Internet (shown as public network 740), regardless of where their workspaces are hosted. As illustrated in this example, client 752 may access any of workspace instances 714 (in data center 712 in availability zone/region 710) or 724 (in data center 722 in availability zone/region 720) through WS POP gateway component 732 in availability zone/region 710, e.g., if the client device through which client 752 accesses its workspace instances is physically located in or near availability zone/region 710. On the other hand, if client 752 subsequently accesses its workspace instances through a client device that is physically located in another availability zone/region, it may access its workspace instances through a different workspace POP gateway component.

As previously noted, WS POP gateway components (such as WS POP gateway component 732) may be multi-tenant access gateways that provide gateway functionality for multiple different workspace clients (e.g., different customers or service subscribers) on whose behalf workspace instances are hosted by the service. In this example, client 758 may also access any of workspace instances 714 (in data center 712 in availability zone/region 710) or 724 (in data center 722 in availability zone/region 720) through WS POP gateway component 732 in availability zone/region 710 (e.g., if the client device through which client 758 accesses its workspace instances is physically located in or near availability zone/region 710), and may subsequently access its workspace instances through a different workspace POP gateway component (e.g., if it accesses its workspace instance through a client device that is physically located in another availability zone/region).

In the example illustrated in FIG. 7A, client 754 may access any of workspace instances 714 (in data center 712 in availability zone/region 710) or 724 (in data center 722 in availability zone/region 720) through WS POP gateway component 734 in availability zone/region 720. Similarly, client 756 may access any of workspace instances 714 (in data center 712 in availability zone/region 710) or 724 (in data center 722 in availability zone/region 720) through WS POP gateway component 736 in availability zone/region 720. In some embodiments, a client may first attempt to access one of their workspace instances through one gateway component, and subsequently (e.g., if the attempt to connect to the workspace instance is unsuccessful, if the latency on the connection is unacceptable, or if the client device through which the client accesses the workspace instance changes) may attempt to access the workspace instance through another one of the workspace POP gateway components.

Figure 7B:
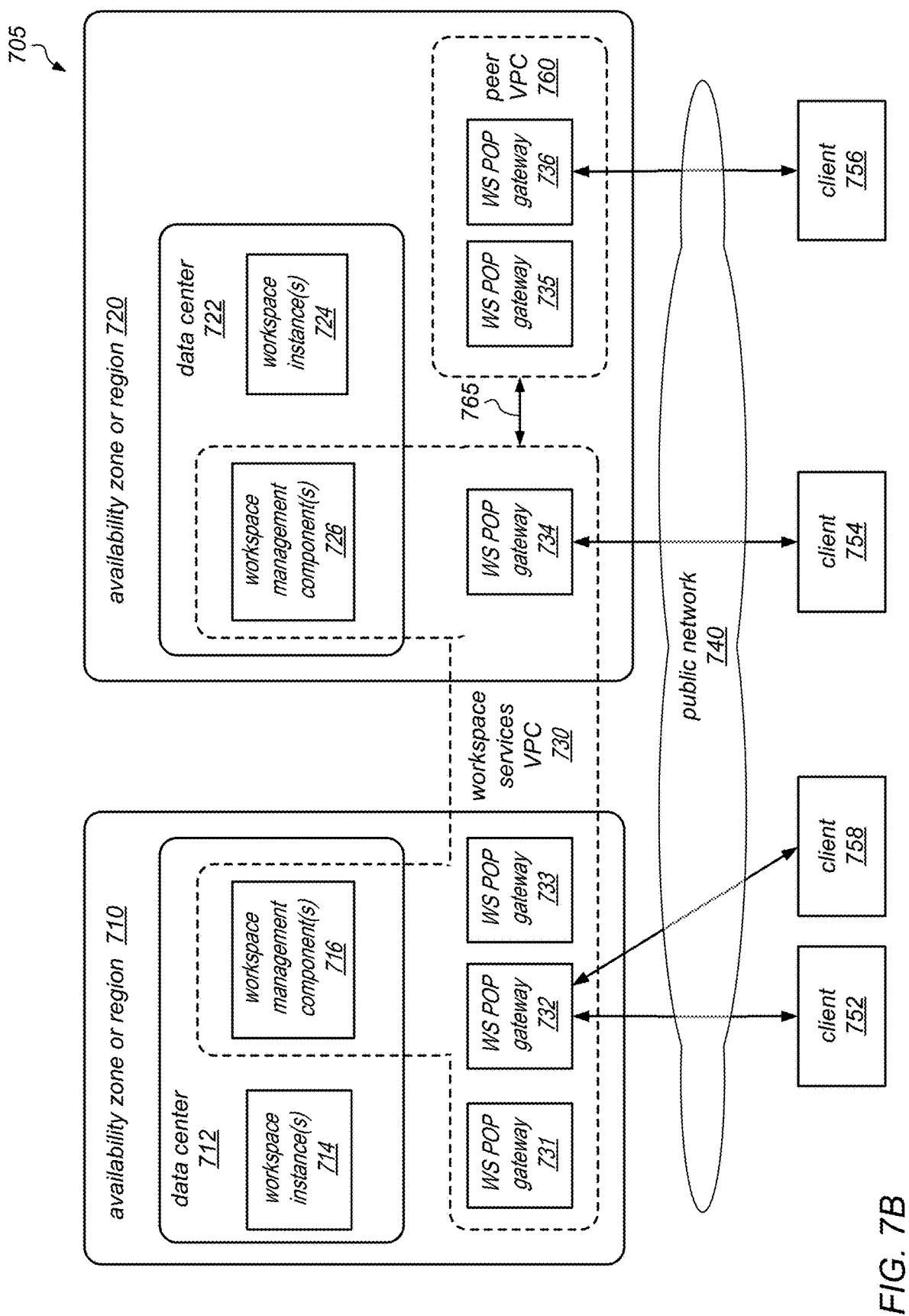
FIG. 7B is a block diagram illustrating an example networked environment in which some gateway components at point of presence locations operate within a virtual private cloud of a virtual desktop service and others operate within a peer VPC, according to at least some embodiments.

FIG. 7B is a block diagram illustrating another example networked environment that provides workspace services to clients, according to at least some embodiments. Networked environment 705 is similar to networked environment 700 illustrated in FIG. 7A. However, in this example, some of the gateway components at point of presence locations operate within the virtual private cloud of the virtual desktop service (e.g., workspace services VPC 730), while others operate within a peer VPC (e.g., peer VPC 760) that is tightly coupled to the virtual private cloud of a virtual desktop service. More specifically, in this example, WS POP gateway components 731, 732, 733, and 734 operate within the virtual private cloud of the virtual desktop service (e.g., workspace services VPC 730), while WS POP gateway components 735 and 736 operation with peer VPC 760, which is communicably coupled to workspace services VPC 730 through peering connection 765. As in the previous example, client 756 may access any of workspace instances 714 (in data center 712 in availability zone/region 710) or 724 (in data center 722 in availability zone/region 720) through WS POP gateway component 736 in availability zone/region 720. However, in this example, WS POP gateway component 736 operates within peer VPC 760 rather than within workspace services VPC 730. Note that even though WS POP gateway component 736 operates within peer VPC 760, the communication channel between WS POP gateway component 736 and any workspace instances accessed by client 756 may have a reliability and latency that is substantially similar to that of the communication channels between WS POP gateway components operating within workspace services VPC 730 and the workspace instances accessed by any of clients 752, 754, 756, or 758. Note that in some embodiments, a peer VPC (such as peer VPC 760) may include WS POP gateway components that are hosted on computing nodes in multiple availability zones or regions. Note also that in still other embodiments, all of the WS POP gateway components of a networked environment that provides workspace services may operate within one or more peer VPCs that are tightly coupled to the workspace services VPC, rather than operating within the workspace services VPC itself.

As previously noted, in some embodiments, a workspace service may be configured to select a gateway component at a particular POP location to be used in handling an interactive video stream for a virtual desktop session dependent on its location (e.g., the proximity of the POP location to the client device to which the interactive video stream will be communicated). For example, if a client (e.g., a customer or service subscriber) is connecting to a virtual desktop session from a client computing device in New York City, the interactive video stream for the session may be handled through a different access gateway than if the client is connecting to the virtual desktop session from a client computing device Shanghai (depending on the locations at which suitable gateway components are hosted) regardless of where the physical computing resources (e.g., one or more computing nodes) that host the virtual desktop instance for the session on behalf of the client are located. Using this approach, the client may experience good network performance (which is controlled, at least up to the selected POP location gateway, by the workspace service itself) regardless of their physical location. In other words, in some embodiments, as the client physically moves the device through which they connect to the virtual desktop instance, the service may automatically redirect the interactive video traffic for the session to the best available gateway (e.g., one that is close to the client device).

In some embodiments, at least some resources (e.g., physical computing resources and/or virtual computing resource instances) at different points of presences (e.g., at edge locations in different geographic areas) may be provisioned as gateway components within the VPC of a workspace service in anticipation of their use by clients in the same (or a nearby) city, country, or region. In some embodiments, the service (or management components thereof) may provision additional virtual computing resources as gateway components at a particular point of presence location (e.g., scaling up the capacity to support connections by clients) if and when the number of users connecting to the workspace service from client devices in the same geographic area warrants such an increase. This auto-scaling of gateway instances may be performed centrally for the workspace service or at particular POP locations, as needed, in different embodiments. In some embodiments, the service may implement a failover mechanism by which traffic between client devices and workspace instances may be directed (or re-directed) to an alternate gateway component (e.g., one that is not hosted at the POP location nearest to the client device) following a loss of communication with one or more gateway components, or a failure of a computing node on which one or more gateway components is hosted at a particular POP location. Similarly, the service may direct (or re-direct) traffic between client devices and workspace instances to particular gateway components (and/or POP locations) in response to a change in the relative workloads experienced by the gateway components (or POP locations). In some embodiments, if traffic from a client device needs to be re-directed away from a gateway component (or POP location) that is near the client device (e.g., due to a failure, for load-balancing, or for any other reason), the system may automatically re-direct the traffic to the next nearest gateway component (or POP location). In other embodiments, the gateway component and/or POP location to which such traffic is re-directed may be dependent on a load-balancing policy or some other type of priority policy for selecting a gateway component from among available gateway components, which may include gateway components that are hosted at point of presence locations near the client and gateway components that are hosted at point of presence locations farther away from the client.

In some embodiments, the service may maintain information indicating which gateways are available for the use of particular clients, and may provide those clients with a list of destination addresses for available gateway components (at particular POP locations). For example, the service may be configured to automatically determining a set of two or more gateway components that are available to provide network interfaces between clients and the virtual computing services, and the point of presence locations at which they are hosted, and to provide that to a client-side component of the workspace service (e.g., a workspaces client process that is executing on the behalf of a particular client). In such embodiments, the client-side component of the workspace service may be configured to select an available gateway component from the list and, if an attempt to connect to a virtual desktop instance through the selected gateway component and begin a virtual desktop session fails, may be configured to cycle through the list of available gateway components in an attempt to connect and begin the session. In some embodiments, the service may be configured to modify the list of destination addresses for available gateway components (at particular POP locations) based on load information or availability information (e.g., in response to an increase or decrease in a workload experienced on one or more of the computing nodes on which the previously available gateway components are hosted, a loss of communication with one or more of the previously available gateway components, or a failure of a computing node on which one or more of the previously available gateway components is hosted) and may provide the updated list to the client-side component of the workspace service.

Figure 8:
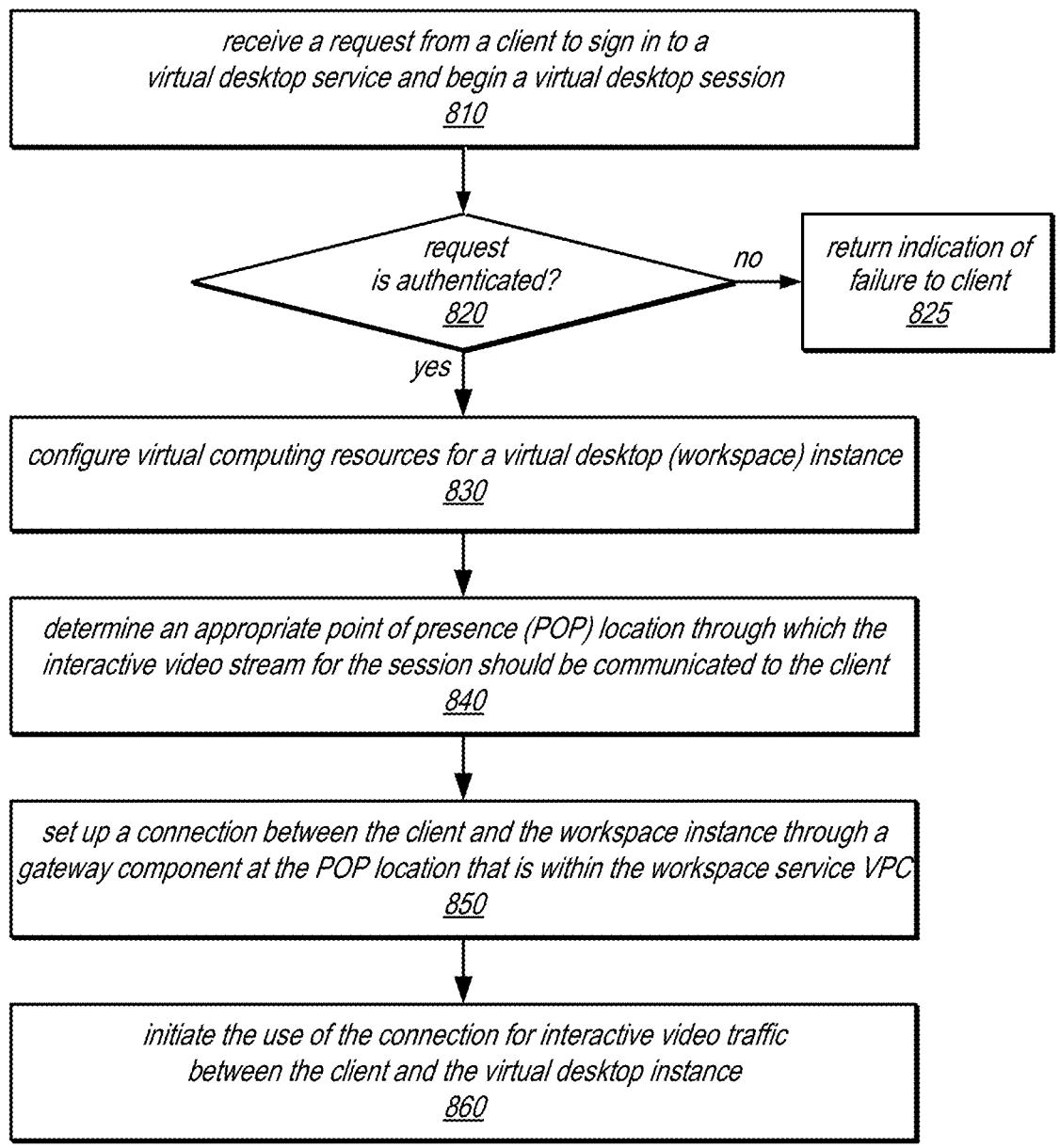
FIG. 8 is a flow diagram illustrating one embodiment of a method for providing virtual desktop services to client through gateway components at point of presence locations.

FIG. 8 is a flow diagram illustrating one embodiment of a method for providing virtual desktop services to client through gateway components at point of presence locations. As illustrated at 810, in this example, the method may include receiving a request from a client to sign in to a virtual desktop service and begin a virtual desktop session (e.g., to instantiate a virtual desktop instance and/or connect to a virtual desktop instance). If the request is not authenticated (e.g., if the client does not produce valid credentials), shown as the negative exit from 820, the method may include returning an indication of failure to the client, as in 825. However, if the request is authenticated, shown as the positive exit from 820), the method may include configuring virtual computing resources for a virtual desktop (workspace) instance for the use of the client, as in 830. For example, the method may include instantiating a virtual resource instance and configuring it to implement a virtual desktop (workspace) on behalf of the client.

As illustrated in this example, the method may include determining an appropriate point of presence (POP) location through which the interactive video stream for the virtual desktop session should be communicated to the client, as in 840. In some embodiments, the client (or end user) may select a particular POP location (or gateway component thereof) for use in communicating with the virtual desktop instance. In other embodiments, the virtual desktop service may be configured to determine (automatically, e.g., based on the location of a client device through which the request was received, on the workloads of various gateway components, or using other criteria or policies) which of multiple available POP locations (and/or gateway components thereof) should be used to handle interactive video stream traffic between the virtual desktop instance and the client.

Once a suitable POP location (and/or gateway component thereof) has been determined, the method may include setting up a connection (or communication channel) between the client and the workspace instance through a gateway component at the selected POP location that is within the virtual private cloud of the workspace service, as in 850. For example, in some embodiments, the method may include a management component of the workspace service establishing a tunnel or pipe from the virtual desktop instance to the gateway component at the POP location over a virtual private network, such that a reliable and low latency connection over which the interactive stream for the virtual desktop instance is carried may be controlled by the workspace service all the way out to the POP location, and the portion of the connection that is carried over a less reliable and/or higher latency public network (e.g., a connection between the gateway component and the client over the public Internet) may be minimized. Note that the management component that establishes a connection or communication channel between the client and the workspace instance through a gateway component at a POP location may or may not be hosted on a computing node that is physically located in the same region or availability zone as the computing node that hosts the gateway component or the computing node that hosts the workspace instance, in different embodiments.

Once the connection is established, the method may include initiating the use of the connection for interactive video traffic between the client and the virtual desktop instance, as in 860. For example, the method ma include the workspace service making the virtual desktop instance available to client (which may include providing credentials usable by a client to access the virtualized computing resource instance), initiating the communication of a stream of pixels (and/or commands for generating and rendering pixels) to the client for display and/or preparing to receive and process inputs received from the client over this connection (e.g., inputs that represent user interactions with the virtual desktop instance, such as keyboard inputs, mouse inputs, or touch-based interface inputs).

Figure 9:
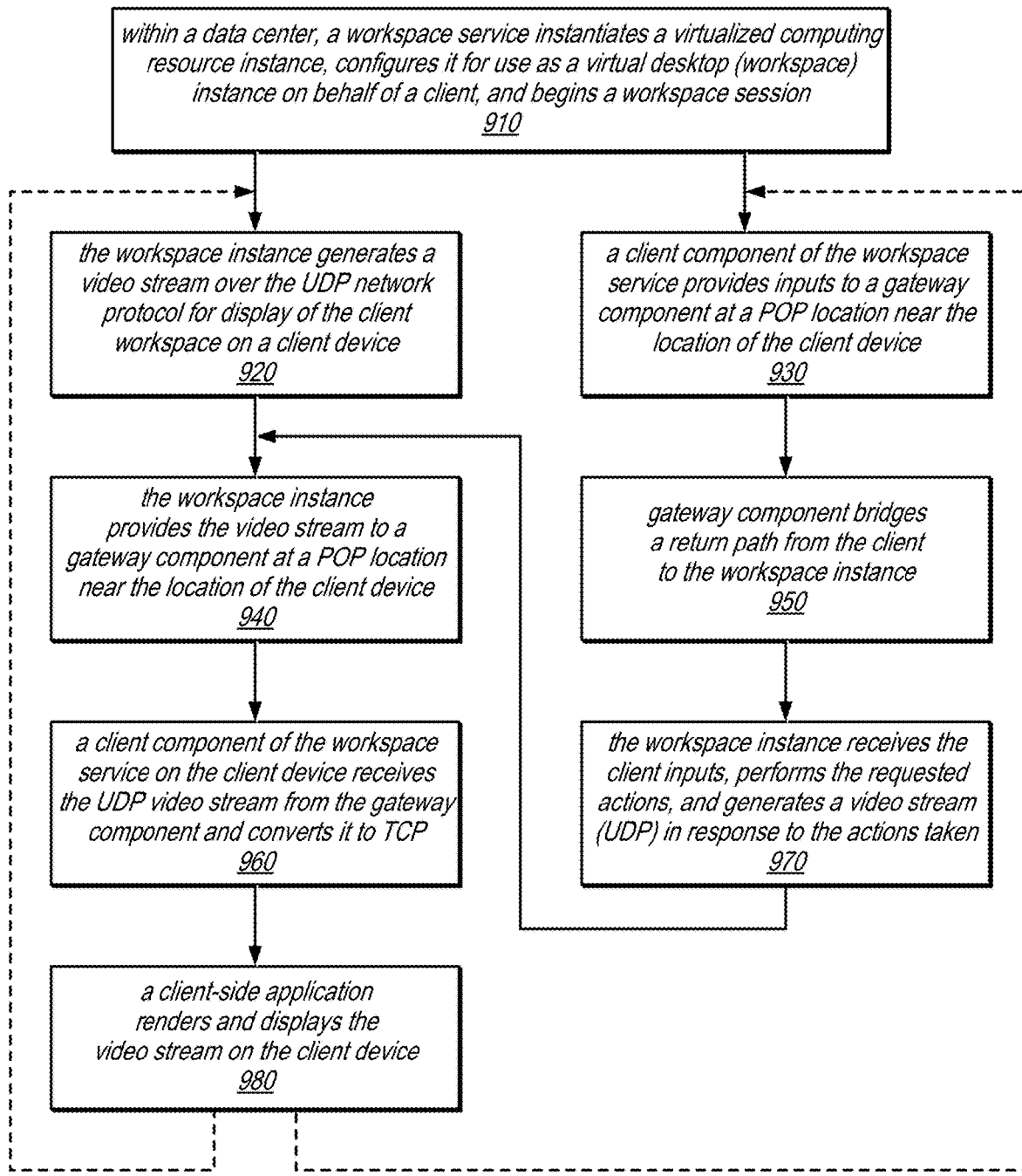
FIG. 9 is a flow diagram illustrating one embodiment of a method for managing interactive video traffic between a workspace provider and a client through a gateway component at a point of presence location.

FIG. 9 is a flow diagram illustrating one embodiment of a method for managing interactive video traffic between a workspace provider and a client through a gateway component at a point of presence location. As illustrated at 910, in this example, the method may include, within a data center, a workspace service instantiating a virtualized computing resource instance, configuring it for use as a virtual desktop (workspace) instance on behalf of a client, and beginning a virtual desktop (workspace) session. In some embodiments, configuring the virtual desktop instance for use as a virtual desktop (workspace) instance and beginning a workspace session may include establishing a communication channel between the virtual desktop (workspace) instance and the client on whose behalf the virtual desktop (workspace) instance was configured through a gateway component at a workspace POP location. As described herein, the portion of the communication channel between the virtual desktop (workspace) instance and the gateway component may be implemented over a virtual private network, while the portion of the communication channel between the gateway component and the client may be implemented over a public network. Once the virtual desktop instance is configured for use as a virtual desktop (workspace) instance and the communication channel has been established, the method may include managing the two-way interactive video traffic between the virtual desktop (workspace) instance and the client on parallel paths, both of which may include the gateway component. For example, one path may be used to communicate a stream of pixels (and/or commands for generating and rendering pixels) from the client's virtual desktop (workspace) instance to the client, and another path may be used to communicate inputs from the client to the virtual desktop (workspace) instance. These two parallel paths are illustrated by the parallel paths on the left and right sides of the flow diagram in FIG. 9, respectively.

As illustrated in this example, the method may include the workspace instance generating a video stream over the UDP network protocol for display of the client workspace on a client device, as in 920. For example, the method may include the workspace instance (or a virtualized computing resource thereof) generating a stream of pixels over the UDP network protocol in response to the execution of an application on the workspace instance on behalf of the client. The method may also include the workspace instance providing the video stream to a gateway component at a POP location near the location of the client device, as in 940. As previously noted, in some embodiments the workspace instance may also provide commands to the client device representing instructions directing the client device to generate and/or render pixels for display by the client device (not shown). Note that, as described above, the gateway component may be one of multiple gateway components that communicate and interoperate with the workspace management component within a virtual private cloud of the workspace service (e.g., communicating over a virtual private network), or it may operate within a separate virtual private cloud that is communicably coupled to the virtual private cloud of the workspace service using a VPC peering mechanism. For example, in embodiments in which the gateway component operates within a peer VPC that is tightly coupled to the VPC of the workspace service, the video stream (including pixel data and/or commands for generating and/or rendering pixels at the client device) may be communicated from the workspace instance to the gateway component over a secure, reliable, low latency communication channel that spans the two VPCs.

The method may include a client component of the workspace service that is executing on the client device receiving the UDP video stream from the gateway component and converting it to TCP, as in 960. For example, in some embodiments, the client device may receive the UDP stream on port 4172 through a firewall on the client device, and, behind that firewall, the client component of the workspace service may convert it to TCP for port 443. As illustrated in this example, the method may include a client-side application rendering and displaying the converted video stream on the client device, as in 980.

In the meantime (e.g., while the operations illustrated in elements 920-980 are being performed), the method may also include a client component of the workspace service providing inputs to a gateway component at a POP location near the location of the client device (e.g., the same gateway component as the one that handles the pixel stream), as in 930. For example, the client may provide inputs representing user interactions with the virtual desktop instance (e.g., interactions involving a keyboard, touch-based interface, and/or mouse) that are similar to user interactions involving a local desktop.

As illustrated in this example, the method may include the gateway component bridging a return path from the client to the workspace instance, as in 950. Note that this path may cross availability zone and/or geographic region boundaries, in some cases. The method may also include the workspace instance receiving the client inputs, performing the requested actions, and generating a video stream (e.g., over the UDP network protocol) in response to the actions taken, as in 970. Once the video stream has been generated, the method may continue as in 940, in this example.

As illustrated in this example, the operations illustrated in FIG. 9 and corresponding to the handling of an interactive video stream may be repeated as inputs are received from the client and new pixel streams (and/or commands for generating and rendering pixels) are generated and communicated to the client device in response (shown as the path through elements 930, 950, 970, 920, 940, 960, and 980, and the feedback from 980 to 930), and as video streams that are generated by the workspace instance in response to the execution of various client applications on the workspace instance are communicated to the client device (shown as the path that includes elements 920, 940, 960, 980, and the feedback from 980 to 920).

Figure 10:
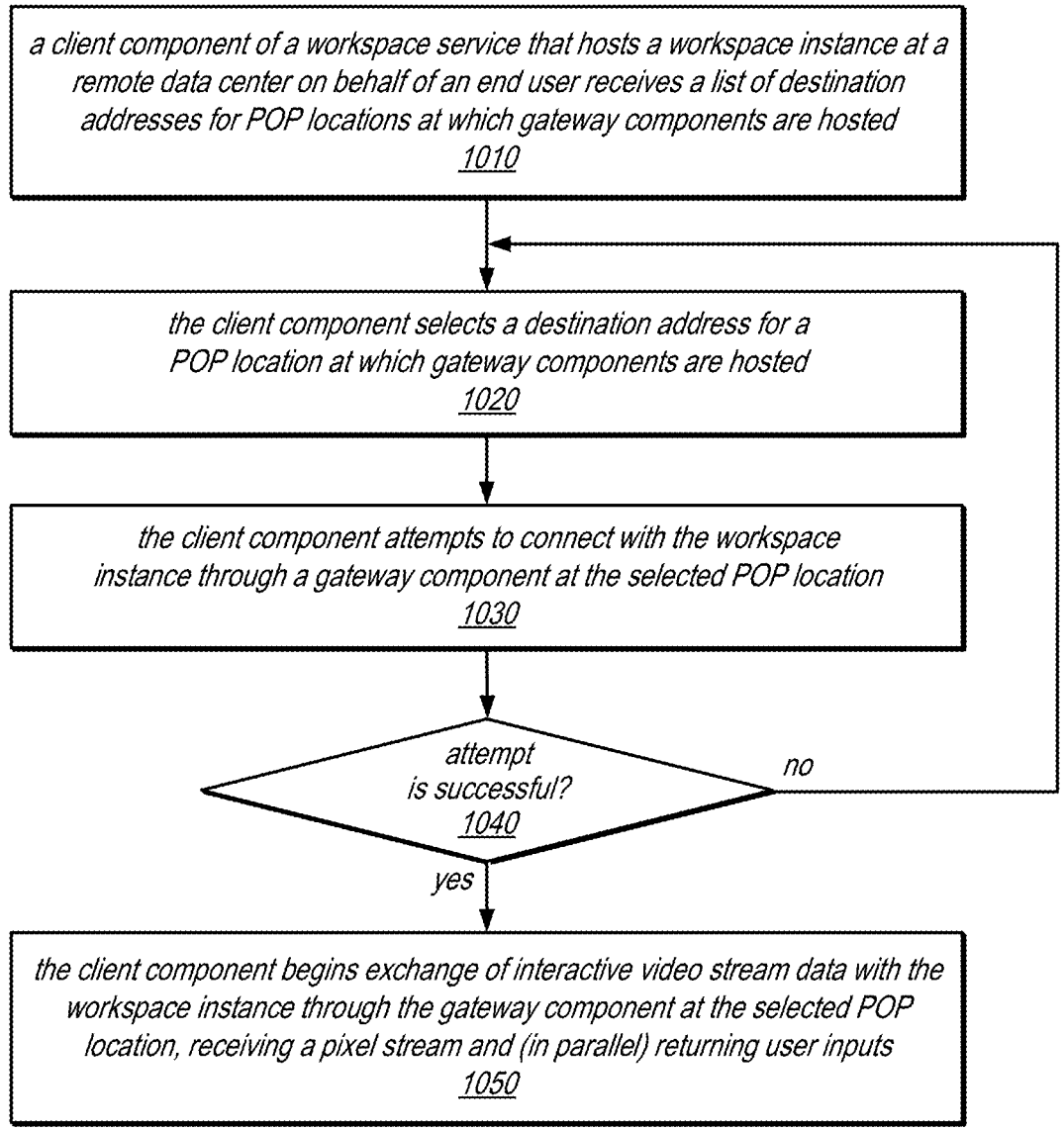
FIG. 10 is a flow diagram illustrating one embodiment of a method for a client to connect to and communicate with a workspace service through a gateway component at a point of presence location.

FIG. 10 is a flow diagram illustrating one embodiment of a method for a client to connect to and communicate with a workspace service through a gateway component at a point of presence location. As illustrated at 1010, in this example, the method may include a client component of a workspace service that hosts a workspace instance at a remote data center on behalf of an end user receiving a list of destination addresses for POP locations at which gateway components are hosted. For example, in some embodiments, the client component of the workspace service may receive such a list (which may identify a set of two or more gateway components that are available to provide a communication interface between the client device on which the client component of the workspace service is executing and the workspace service and the point of presence locations in which they are hosted) from the workspace service during instantiation (installation) or configuration (initialization) of the client component on the client device. In some such embodiments, the client component may receive updated lists (or updates to be applied to the list) periodically or on an as-needed or as-requested basis (e.g., in response to changes in the number or configuration of the gateway components).

As illustrated in this example, the method may include the client component of the workspace service selecting a destination address for a POP location at which gateway components are hosted (as in 1020) from among those included on the list received from the workspace service. For example, in various embodiments, the destination addresses may selected automatically or with user input, and the selection itself may be based on the location of the client device on which the client component is executing, the workload experienced at one or more POP locations and/or by various gateway components thereof, and/or other criteria or preferences (some of which may be specified in default policies of the workspace service or in client-specific policies). As illustrated in FIG. 10, the method may include the client component of the workspace service attempting to connect with the workspace instance through a gateway component at the selected POP location, as in 1030.

If the attempt to connect to the workspace instance is successful (shown as the positive exit from 1040), the method may include the client component beginning the exchange of an interactive video stream data with the workspace instance through the gateway component at the selected POP location, which may include receiving a pixel stream from the workspace instance and (in parallel) returning user inputs (as in 1050), as described herein. As previously noted, the interactive video stream may also include commands that are communicated to the client component from the workspace instance and that represent instructions directing the client component to generate and/or render pixels for display by the client device, in some embodiments. However, if the attempt to connect to the workspace instance is not successful (shown as the negative exit from 1040), the method may include the client component of the workspace service selecting another destination address for a POP location at which gateway components are hosted and trying again to connect with the workspace instance. This illustrated in FIG. 10 by the feedback from the negative exit of 1040 to 1020. Note that, as described herein, traffic between the workspace instance and the client other than the interactive video stream (e.g., connection requests or other types of requests or data) may be communicated over a different interface of the workspace instance than that used to carry the interactive video stream. For example, an E0-type interface (such as that described above) may be used to carry the interactive video stream, while an E1-type interface (such as that described above) may be used to communicate other types of information and/or to communicate with network entities other than the workspace services client on whose behalf the workspace instance was created. Note also that, in some embodiments, a client (e.g., a customer or service subscriber) may be able to specify (e.g., through an interface of a client component of the workspace service) that all accesses to their workspace instances should be communicated through a particular gateway component, regardless of the physical location of the client device through which the client accesses their workspace instances. In other embodiments, the client may be able to specify a default gateway component for use (regardless of their location), but may allow this default to be overridden, under certain circumstances. In still other embodiments, the client may be able to specify that a gateway component should be selected for use dependent, at least in part, on the physical location of the client device through which the client accesses their workspace instances.

Note that many example embodiments have been described in terms of gateway components that are located at POP locations corresponding to the edge of a service provider network. However, in other embodiments, the techniques described herein for providing low latency connections to workspaces in a cloud computing environment may be applied to other types of gateway components or routers that perform a network function along various paths from workspace instances to client devices. For example, a virtual private cloud of a workspace service may be extended out to similar remote networking components that are not at edge locations, but that are located closer to the client devices than the data centers in which the computing nodes on which the workspace instances are hosted are physically located. In such embodiments, performance may be improved by providing the interactive video stream for virtual desktop sessions over a secure, reliable, and low latency connection (e.g., over a virtual private network controlled by the workspace service) up to those remote networking components, reducing the contribution of other networks (e.g., potentially lower quality networks) along the path to the client devices.

Illustrative System

In at least some embodiments, a system that implements some or all of the techniques for providing low latency connections to workspaces in a cloud computing environment as described herein may include a general-purpose computer system that includes or is configured to access a non-transitory computer-accessible (e.g., computer-readable) media, such as computer system 1100 illustrated in FIG. 11. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, workspace management components, and/or virtual desktop instances; gateway components or other components at point of presence locations; or client computing devices, client-side components of a workspace service, firewalls, or other components on a client network) may be implemented using a computer system similar to computer system 1100 that has been configured to provide the functionality of those components. In the illustrated embodiment, computer system 1100 includes one or more processors 1110 coupled to a system memory 1120 via an input/output (I/O) interface 1130. Computer system 1100 further includes one or more network interfaces 1140 coupled to I/O interface 1130. In some embodiments, network interfaces 1140 may include two or more network interfaces, including, e.g., one configured for communication between a virtualized computing resource hosted on the computer system 1100 and its clients, and one configured for communication between a virtualized computing resource and external resources, computing systems, data centers, or Internet destinations on networks other than the provider network and a client network on whose behalf the virtualized computing resources are hosted.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing low latency connections to workspaces in a cloud computing environment, are shown stored within system memory 1120 as code 1125 and data 1126.

In one embodiment, I/O interface 1130 may be configured to coordinate I/O traffic between processor 1110, system memory 1120, and any peripheral devices in the device, including any of network interface(s) 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface(s) 1140 may be configured to allow data to be exchanged between computer system 1100 and other devices 1160 attached to a network or networks 1150, such as other computer systems or devices as illustrated in the figures, for example. In various embodiments, network interface(s) 1140 may support communication via any suitable wired or wireless general data networks, such as types of Ethernet network, for example. Additionally, network interface(s) 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for implementing various embodiments of the techniques for providing low latency connections to workspaces in a cloud computing environment described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1100 via I/O interface 1130. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface(s) 1140.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, by one or more computers:
        sending, from a client device, a request to a workspace service to initiate a workspace instance that is hosted at a particular location of a plurality of locations for the workspace service;
        receiving, at the client device in response to the request to initiate the workspace instance, a list of destination addresses for a plurality of gateway components implemented across the plurality of locations for the workspace service, wherein the workspace instance hosted at the particular location is accessible via each of the plurality of gateway components across the plurality of locations;
        selecting, at the client device, a particular destination address from the list of destination addresses for a particular gateway component of the plurality of gateway components for accessing the workspace instance at the particular location based at least in part on a location of the client device and respective locations of the plurality of gateway components; and
        establishing, from the client device, a connection to the workspace instance at the particular location via particular destination address for the particular the gateway component.

2. The method of claim 1, further comprising:
    determining that an attempt to establish the connection is unsuccessful, selecting, at the client device, another destination address from the list of destination addresses for another gateway component of the plurality of gateway components based at least in part on the location of the client device and the respective locations of the plurality of gateway components; and
    establishing, from the client device, another connection to the workspace instance via the other destination address for the other gateway component.

3. The method of claim 1, further comprising:
    receiving, at the client device, an interactive video stream of the workspace instance via the gateway component.

4. The method of claim 3, further comprising:
    rendering and displaying the interactive video stream on a display device of the client device.

5. The method of claim 3, wherein the interactive video stream is generated according to a User Datagram Protocol (UDP) network protocol.

6. The method of claim 1, wherein selecting the particular destination address is further based at least in part on respective workloads at one or more of the plurality of gateway components.

7. The method of claim 1, further comprising:
    sending, to the workspace instance via the gateway component, user inputs from the client device.

8. A system, comprising:
    one or more processors; and
    a memory storing instructions that, when executed on or across the one or more processors, cause the one or more processors to:
        send a request to a workspace service to initiate a workspace instance that is hosted at a particular location of a plurality of locations for the workspace service;
        receive, in response to the request to initiate the workspace instance, a list of destination addresses for a plurality of gateway components implemented across the plurality of locations for the workspace service, wherein the workspace instance at the particular location is accessible via each of the plurality of gateway components across the plurality of locations;
        select a particular destination address from the list of destination addresses for a particular gateway component of the plurality of gateway components for accessing the workspace instance at the particular location based at least in part on a location of the client device and respective locations of the plurality of gateway components; and establish a connection to the workspace instance at the particular location via the particular destination address for the particular gateway component.

9. The system of claim 8, wherein the memory further comprises instructions that cause the one or more processors to:
determine that an attempt to establish the connection is unsuccessful, selecting, at the client device, another destination address from the list of destination addresses for another gateway component of the plurality of gateway components based at least in part on the location of the client device and the respective locations of the plurality of gateway components; and
establish another connection to the workspace instance via the other destination address for the other gateway component.

10. The system of claim 8, wherein the memory further comprises instructions that cause the one or more processors to:
receiving, at the client device, an interactive video stream of the workspace instance via the gateway component.

11. The system of claim 10, wherein the memory further comprises instructions that cause the one or more processors to:
render and display the interactive video stream on a display device of the client device.

12. The system of claim 11, wherein the interactive video stream is generated according to a User Datagram Protocol (UDP) network protocol.

13. The system of claim 8, wherein selecting the particular destination address is further based at least in part on respective workloads at one or more of the plurality of gateway components.

14. The system of claim 8, wherein the memory further comprises instructions that cause the one or more processors to:
send, to the workspace instance via the gateway component, user inputs.

15. One or more non-transitory, computer readable storage media storing instructions that, when executed on or across one or more processors, cause the one or more processors to:
send a request to a workspace service to initiate a workspace instance that is hosted at a particular location of a plurality of locations for the workspace service;
receive, in response to the request to initiate the workspace instance, a list of destination addresses for a plurality of gateway components implemented across the plurality of locations for the workspace service, wherein the workspace instance at the particular location is accessible via each of the plurality of gateway components across the plurality of locations;
select a particular destination address from the list of destination addresses for a particular gateway component of the plurality of gateway components for accessing the workspace instance at the particular location based at least in part on a location of the client device and respective locations of the plurality of gateway components; and
establish a connection to the workspace instance at the particular location via the particular destination address for the particular gateway component.

16. The one or more non-transitory, computer readable storage media of claim 15, wherein the memory further comprises instructions that, when executed on or across the one or more processors, cause the one or more processors to:
determine that an attempt to establish the connection is unsuccessful, selecting, at the client device, another destination address from the list of destination addresses for another gateway component of the plurality of gateway components based at least in part on the location of the client device and the respective locations of the plurality of gateway components; and
establish another connection to the workspace instance via the other destination address for the other gateway component.

17. The one or more non-transitory, computer readable storage media of claim 15, wherein the memory further comprises instructions that, when executed on or across the one or more processors, cause the one or more processors to:
receiving, at the client device, an interactive video stream of the workspace instance via the gateway component.

18. The one or more non-transitory, computer readable storage media of claim 17, wherein the memory further comprises instructions that, when executed on or across the one or more processors, cause the one or more processors to:
render and display the interactive video stream on a display device of the client device.

19. The one or more non-transitory, computer readable storage media of claim 15, wherein selecting the particular destination address is further based at least in part on respective workloads at one or more of the plurality of gateway components.

20. The one or more non-transitory, computer readable storage media of claim 15, wherein the memory further comprises instructions that, when executed on or across the one or more processors, cause the one or more processors to:
send, to the workspace instance via the gateway component, user inputs.

* * * * *